United States Patent
Park et al.

(10) Patent No.: US 10,540,302 B2
(45) Date of Patent: Jan. 21, 2020

(54) METHOD AND APPARATUS FOR SWITCHING INPUT CHARACTER IN WFD

(71) Applicant: LG ELECTRONICS INC., Seoul (KR)

(72) Inventors: Giwon Park, Seoul (KR); Byungjoo Lee, Seoul (KR); Dongcheol Kim, Seoul (KR); Hyunhee Park, Seoul (KR); Taesung Lim, Seoul (KR)

(73) Assignee: LG ELECTRONICS INC., Seoul (KR)

( * ) Notice: Subject to any disclaimer, the term of this patent is extended or adjusted under 35 U.S.C. 154(b) by 163 days.

(21) Appl. No.: 15/567,023

(22) PCT Filed: Mar. 11, 2016

(86) PCT No.: PCT/KR2016/002459
§ 371 (c)(1),
(2) Date: Oct. 16, 2017

(87) PCT Pub. No.: WO2016/167475
PCT Pub. Date: Oct. 20, 2016

(65) Prior Publication Data
US 2018/0129615 A1   May 10, 2018

Related U.S. Application Data

(60) Provisional application No. 62/180,090, filed on Jun. 16, 2015, provisional application No. 62/175,438, (Continued)

(51) Int. Cl.
*G06F 13/14* (2006.01)
*G06F 3/0481* (2013.01)
(Continued)

(52) U.S. Cl.
CPC .......... *G06F 13/14* (2013.01); *G06F 3/04817* (2013.01); *G06F 3/04886* (2013.01); *G06F 3/04897* (2013.01); *H04L 29/08* (2013.01)

(58) Field of Classification Search
CPC combination set(s) only.
See application file for complete search history.

(56) References Cited

U.S. PATENT DOCUMENTS

2011/0107388 A1*   5/2011   Lee .................... H04L 65/1066
                                                              725/118

FOREIGN PATENT DOCUMENTS

| JP | 2013-150282 A | 8/2013 |
| KR | 10-2012-0082846 A | 7/2012 |

(Continued)

*Primary Examiner* — Deeprose Subedi
(74) *Attorney, Agent, or Firm* — Dentons US LLP

(57) ABSTRACT

A method and an apparatus for switching an input character in a WFD are disclosed. The method for switching an input character in a WFD comprises the steps of: transmitting, by a first WFD device, a character switch capability parameter to a second WFD device through a UIBC capability negotiation process with the second WFD device; transmitting, by the first WFD device, a first character switch establishment parameter to the second WFD device through a UIBC capability UIBC establishment process so as to establish the first character outputted onto each screen of the first WFD device and the second WFD device; transmitting, by the first WFD device, a key code for a character switch button through a UIBC to the second WFD device through a user input device of the first WFD device; and transmitting, by the first WFD device, a second character switch establishment parameter to the second WFD device through a UIBC re-establishment process so as to switch, to the second character, the first character outputted onto each screen of the first WFD device and the second WFD device.

10 Claims, 21 Drawing Sheets

Related U.S. Application Data filed on Jun. 15, 2015, provisional application No. 62/149,535, filed on Apr. 18, 2015, provisional application No. 62/149,534, filed on Apr. 18, 2015, provisional application No. 62/148,753, filed on Apr. 17, 2015.

(51) Int. Cl.
  *G06F 3/0488* (2013.01)
  *G06F 3/0489* (2013.01)
  *H04L 29/08* (2006.01)

(56) References Cited

FOREIGN PATENT DOCUMENTS

| KR | 10-2013-0038544 A | 4/2013 |
| KR | 10-2013-0126973 A | 11/2013 |
| KR | 10-2014-0081172 A | 7/2014 |

* cited by examiner

METHOD AND APPARATUS FOR SWITCHING INPUT CHARACTER IN WFD

CROSS-REFERENCE TO RELATED APPLICATIONS

This application is the National Stage filing under 35 U.S.C. 371 of International Application No. PCT/KR2016/002459, filed on Mar. 11, 2016, which claims the benefit of U.S. Provisional Applications No. 62/148,753 filed on Apr. 17, 2015, No. 62/149,534 filed on Apr. 18, 2015, No. 62/149,535 filed on Apr. 18, 2015, No. 62/175,438 filed on Jun. 15, 2015, and No. 62/180,090 filed on Jun. 16, 2015, the contents of which are all hereby incorporated by reference herein in their entirety.

BACKGROUND OF THE INVENTION

Field of the Invention

The present invention relates to a wireless fidelity (WiFi) display (WFD), and more particularly, to a method and an apparatus for switching an input character in the WFD.

Related Art

The performance of mobile devices is greatly improved up to a degree comparable to that of personal computers (PCs), but there is still a limitation in the screen size. Particularly, as the portability of smartphones is important, the screen size of 6 inches is considered as the Maginot line, and a display of 6 inches may still be a small screen for a user who enjoys multimedia contents.

Accordingly, a technology for enabling a video viewed on a mobile device to be viewed on a large-screen TV (television) or a monitor is being studied. This technology may be represented by a term called wireless display transmission technology. The wireless display transmission technology may be roughly divided into content transmission and mirroring (screen casting). Content transmission needs to be linked with Video on Demand (VOD) service, not transmitting a mobile device screen as it is. The content transmission is a method of transmitting video signals, and the mirroring is a method of transmitting content files to a remote device by streaming and again displaying the content files on a large screen such as a TV.

The mirroring (screen casting), as the name implies, is a method of displaying the images outputted to a mobile device at the same time as if the images were mirrored. The mirroring (screen casting) is similar to a method of projecting a computer screen on a projector by connecting by wired methods such as D-Subminiature, RGB (D-sub), Digital Visual Interface (DVI) and High-Definition Multimedia Interface (HDMI) upon presentation. The mirroring method is advantageous in that pixel information of the original screen can be wirelessly transmitted without being dependent on a specific service in real-time.

WiFi Miracast is being studied as a wireless display transmission technology using WiFi. Miracast is a wireless video transmission standard and a wireless display transmission technology created by the WiFi Alliance. Miracast is a type of mirroring (screen casting) technology that compresses images and sounds to send the compressed images and sounds to a wireless LAN, and then decompresses the images and sounds in a dongle or an integral type of receiver to display the images and sounds on the screen.

SUMMARY OF THE INVENTION

The present invention provides a method for switching a character in a WFD.

The present invention also provides an apparatus for performing the method for switching a character in the WFD.

In an aspect, a method for switching an input character in a WiFi display (WFD) is provided. The method may include: transmitting, by a first WFD device, a character switch capability parameter to a second WFD device through a UIBC capability negotiation process with the second WFD device; transmitting, by the first WFD device, a first character switch establishment parameter to the second WFD device through a UIBC establishment process so as to establish the first character outputted onto each screen of the first WFD device and the second WFD device; transmitting, by the first WFD device, a key code for a character switch button through a UIBC to the second WFD device through a user input device of the first WFD device; and transmitting, by the first WFD device, a second character switch establishment parameter to the second WFD device through a UIBC re-establishment process so as to switch, to the second character, the first character outputted onto each screen of the first WFD device and the second WFD device, and the first WFD device may be a device for supporting streaming of multimedia contents and the second WFD device may be a device for receiving and rendering the multimedia contents from the first WFD device through a peer-to-peer (P2P) link with the first WFD device.

In another aspect, a first WiFi display (WFD) device for switching an input character is provided. The first WFD device may include: a communication with for communication with a second WFD device; and a processor connected with the communication unit to be operable, and the processor may be implemented to transmit a character switch capability parameter to a second WFD device through a UIBC capability negotiation process with the second WFD device, transmit a first character switch establishment parameter to the second WFD device through a UIBC establishment process so as to establish the first character outputted onto each screen of the first WFD device and the second WFD device, transmit a key code for a character switch button through a UIBC to the second WFD device through a user input device of the first WFD device, and transmit a second character switch establishment parameter to the second WFD device through a UIBC re-establishment process so as to switch, to the second character, the first character outputted onto each screen of the first WFD device and the second WFD device, and the first WFD device may be a device for supporting streaming of multimedia contents, and the second WFD device may be a device for receiving and rendering the multimedia contents from the first WFD device through a peer-to-peer (P2P) link with the first WFD device.

A character switch button which is a non-ASCII code may be configured to be recognized. Therefore, when the character switch button of a user input device connected to a WFD source or a WFD sink is pressed, whether or not a character is switched is recognized and the character switched on the WFD source and the WFD sink is enabled to be output.

DESCRIPTION OF EXEMPLARY EMBODIMENTS

In an existing wireless LAN system, an operation between apparatuses (AP and STA (station)) in an infrastructure basic service set (BSS) in which an access point (AP) functions as a hub is mainly defined. The AP may be responsible for a physical layer support function for wireless/wired connections, a routing function for devices on the network, a function of adding/removing devices to/from the network, and a service provisioning function. That is, in the existing wireless LAN system, the devices in the network are connected through the AP, and are not directly connected to each other.

A Wi-Fi Direct standard is defined as a technique for supporting direct connection between devices. The Wi-Fi Direct is a direct communication technology that enables easy connection between devices (or stations (STAs)) without an access point that is basically required in an existing WLAN system. When the WiFi Direct is used, a connection between devices may be established without complicated setup processes, and various services may be provided to a user.

In Wi-Fi Alliance (WFA), a Wi-Fi Direct Service (WI-DS) that supports various services (e.g., Send, Play, Display, and Print,) using Wi-Fi Direct links is being studied. According to WFDS, an application may be controlled or managed by a service platform called an Application Service Platform (ASP).

WFDS devices by supported WFDS include devices that support wireless LAN systems such as display devices, printers, digital cameras, projectors, and smart phones. Also, the WFDS device may include an STA and an AP. WI-DS devices within a WFDS network may be directly connected to each other.

Figure 1:
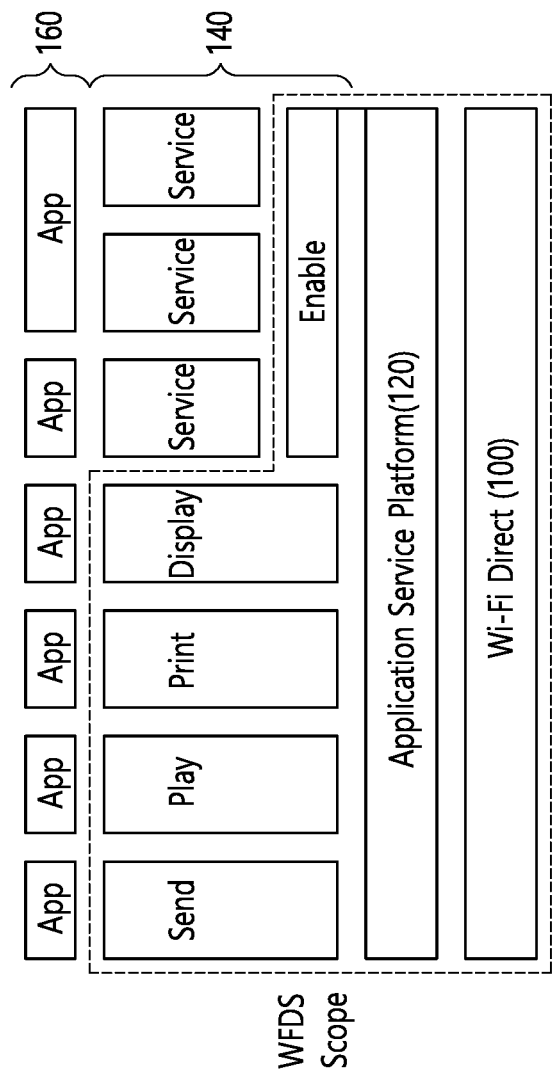
FIG. 1 is a conceptual view illustrating components of a WiFi direct service (WFDS) framework.

FIG. 1 is a conceptual view illustrating a WiFi Direct Service (WFDS) framework component.

Referring to FIG. 1, a WFDS framework may include a Wi-Fi Direct layer 100, an ASP 120, a service layer 140, and an application layer 160.

The Wi-Fi Direct layer 100 is a medium access control (MAC) layer defined in the Wi-Fi Direct standard. Under the Wi-Fi Direct layer 100, a wireless connection may be configured by a physical layer (not shown) compatible with the Wi-Fi PHY. Over the Wi-Fi Direct layer 100, an Application Service Platform (ASP) 120 is defined.

The ASP 120 is a common shared platform, and performs session management, service command processing, and inter-ASP control and security functions between the application layer 160 thereover and the Wi-Fi Direct layer 100 thereunder.

The service layer 140 is defined over the ASP 120. For example, in the service layer 140, four basic services such as Send, Play, Display, and Print services and services defined in a third party application may be supported. Also, the service layer 140 may support a Wi-Fi Serial Bus (WSB), a Wi-Fi Docking, or a Neighbor Awareness Network (NAN).

The application layer 160 may provide a User Interface (UI), may represent information in a human-recognizable form and deliver a user input to a lower layer.

Hereinafter, a Wireless Fidelity (WiFi) Display (WFD) among WFDS is more specifically disclosed in the embodiment of the present invention.

The WFD standard is defined to transmit audio/video (AV) data between devices while satisfying high quality and low latency. Through a WFD network (WFD session) to which the WFD standard is applied, Wi-Fi devices may be connected to each other in a peer-to-peer manner without going through a home network, an office network, or a hot-spot network. Hereinafter, a device for transmitting and receiving data according to the WFD standard may be expressed by a term called a WFD device. WFD devices in a WFD network may search for information (e.g., capability information) about the WFD device, and establish a WFD session, and then render the contents through the WFD session.

The WFD session may be a network between a source device providing contents and a sink device receiving and rendering contents. The source device may also be referred to as a term, the WFD source, and the sink device may also be referred to as a term, the WFD sink. The WFD source may mirror the data existing on the display (or screen) of the WFD source to the display of the WFD sink.

The WFD source and the WFD sink may exchange a first sequence message with each other to perform device search and service search procedures. After the device search and service search procedures between the WFD source and the WFD sink are completed, Internet Protocol (IP) addresses may be assigned to each of the WFD source and the WFD sink. A Transmission Control Protocol (TCP) connection is established between the WFD source and the WFD sink, and thereafter Real-Time Streaming Protocol (RTSP) and Real-Time Protocol (RTP) stacks for the WFD source and the WFD sink may be activated.

The capability negotiation procedure between the WFD source and the WFD sink is performed through the RTSP, and while the capability negotiation procedure is being performed, the WFD source and the WFD sink may exchange RTSP-based messages (M (message) 1 to M4). Thereafter, the WFD source and the WFD sink may exchange WFD session control messages. A data session through the RTP may also be established between the WFD source and the WFD sink. In the WFD network, a User Datagram Protocol (UDP) may be used for data transport.

Figure 2:
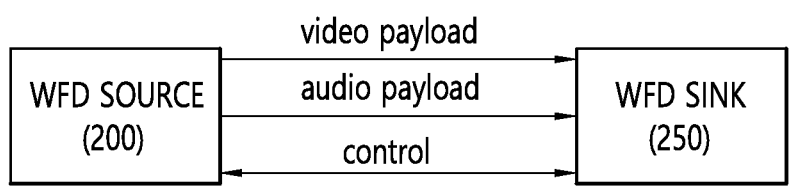
FIG. 2 is a conceptual view illustrating a WFD network.

FIG. 2 is a conceptual view illustrating a WFD network.

Referring to FIG. 2, a WFD source 200 and a WFD sink 250 as WFD devices may be connected based on WiFi-P2P.

Here, the WFD source 200 may be a device for supporting the streaming of multimedia contents through a WiFi Peer-to-Peer (P2P) link, and the WFD sink 250 may be a device that receives multimedia contents from the WFD source 200 through the P2P link and performs a procedure of generating images and/or sounds. The procedure of generating images and/or sounds may be expressed as a term called rendering.

The WFD sink 250 may be divided into a primary sink and a secondary sink. In particular, the secondary sink may render only an audio payload when connected independently of the WFD source 200.

Figure 3:
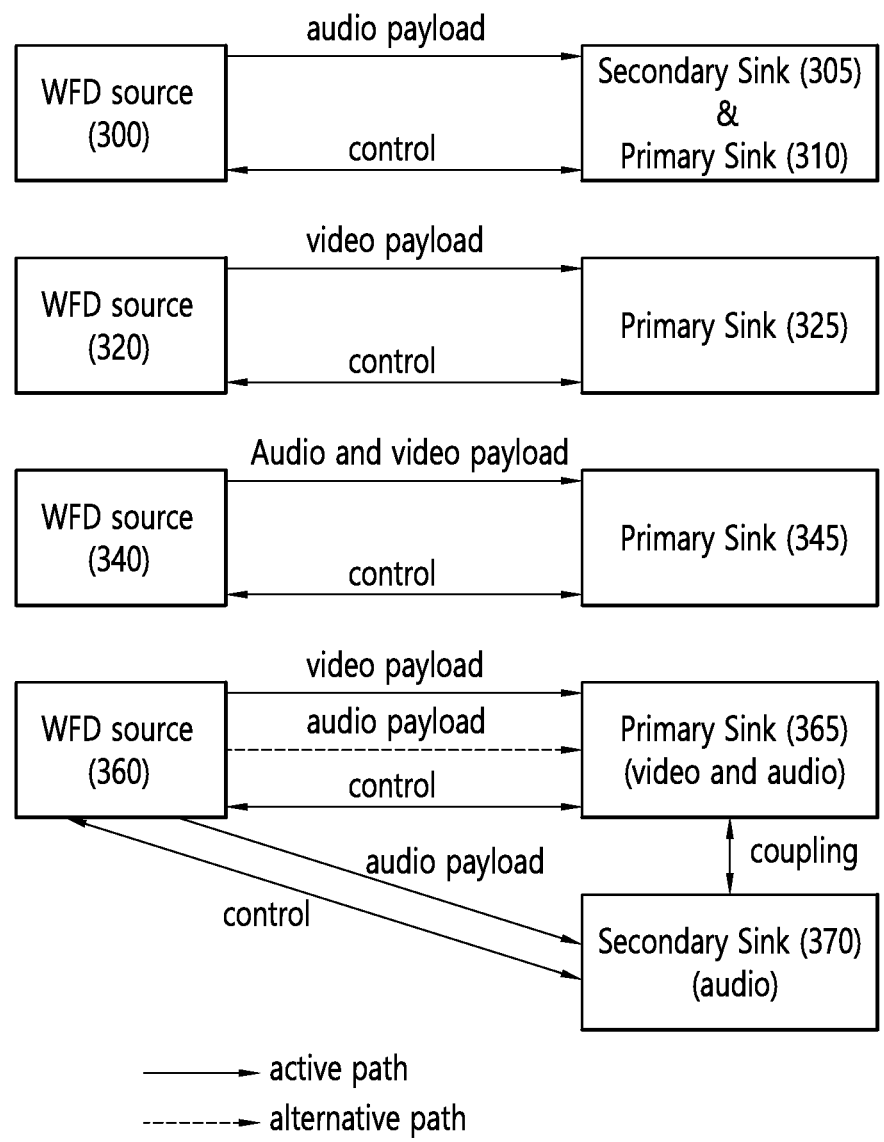
FIG. 3 is a conceptual view illustrating a WFD session.

FIG. 3 is a conceptual view illustrating a WFD session.

The first top of FIG. 3 is an audio-only session. A WFD source 300 may be connected to either a primary sink 305 or a secondary sink 310 through the audio-only session.

The second top of FIG. 3 is a video-only session. A WFD source 320 may be connected to a primary sink 325.

The third top of FIG. 3 is an audio and video session, and similarly to the video-only session, a WFD source 340 may be connected to a primary sink 345.

The fourth top of FIG. 3 discloses a session connection in a coupled WFD sink operation. In the coupled WFD sink operation, a primary sink 365 may render a video, and a secondary sink 370 may render an audio, respectively. Alternatively, the primary sink 365 may render both video and audio.

Figure 4:
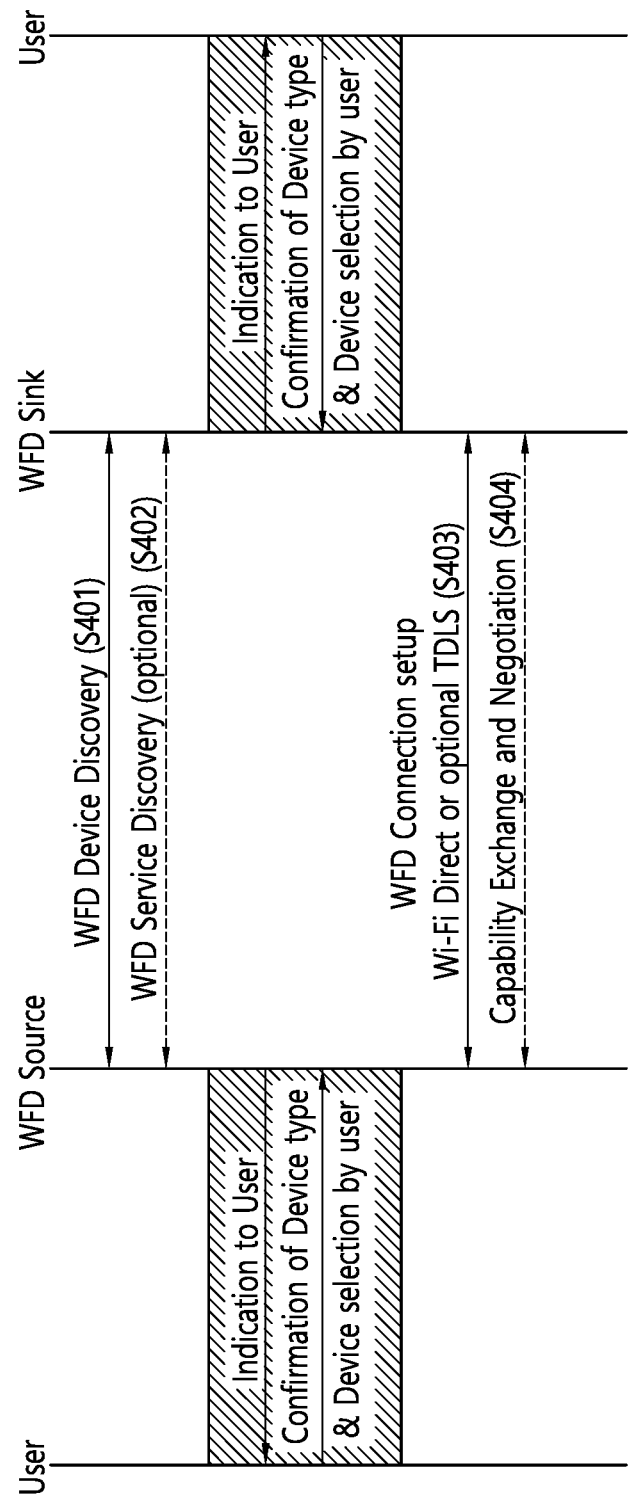
FIG. 4 is a conceptual view illustrating a WFD network.

Such a WFD session may be established after performing a procedure as shown in FIG. 4 below.

FIG. 4 is a conceptual view illustrating a WFD session configuration method.

Referring to FIG. 4, after a WFD device discovery (S401), a WFD service discovery (S402), a WFD connection setup (S403), and a capability exchange and negotiation (S404) are performed, a WFD session may be set.

Specifically, in the WFD device discovery procedure (S401), the WFD source may find a peer device for WFD, i.e., a WFD sink, through the WFD device discovery procedure.

A beacon frame, a probe request frame, and a probe response frame, etc. transmitted for WFD device discovery by the WFD source and the WFD sink may include a WFD Information Element (IE). Here, the WFD IE may be an information element including information related to WFD such as device type and device status.

The WFD source may send a probe request frame including the WFD IE to the WFD sink, and the WFD sink may transmit a probe response frame including the WFD IE in response to the probe request frame. If the WFD device is associated with an infrastructure AP and operates as a Wi-Fi P2P device, the probe request frame may include a WFD IE and a P2P information element. The probe response frame, which is a response to the probe request frame, may be transmitted through the channel through which the probe request frame is received, and may include both the P2P IE and the WFD IE.

Unmentioned contents related to the WFD device discovery may comply with the 'Wi-Fi Display Technical Specification' and/or the 'Wi-Fi Peer-to-Peer (P2P) Technical Specification Wi-Fi Direct Service Addendum' documents, which may be applied to the following descriptions.

In the WFD service discovery procedure (S402), a discovery for the service capability may be performed between the WFD source and the WFD sink performing the WFD device discovery. For example, when the WFD source transmits a service discovery request frame including information about the WFD capability, the WFD sink may send a service discovery response frame including information about the WFD capability in response to the service discovery request frame. The WFD service discovery procedure may be an optional procedure.

The probe request frame and the probe response frame used in the WFD device discovery procedure for performing the WFD service discovery procedure may include information indicating whether the WFD device has the capability to support the service discovery procedure.

In the WFD connection setup procedure (S403), the WFD device performing the WFD device discovery procedure and optionally the WFD service discovery procedure may select a WFD device for the WFD connection setup. After the WFD device for WFD connection setup is selected according to policy or user input, any one connectivity scheme of Wi-Fi P2P and tunneled direct link service (TDLS) may be used for WFD connection. The WFD devices may determine a connection method based on an associated Basic Service Set Identifier (BSSID) subelement that is transported together with the preferred connectivity information and the WFD information element.

Figure 5:
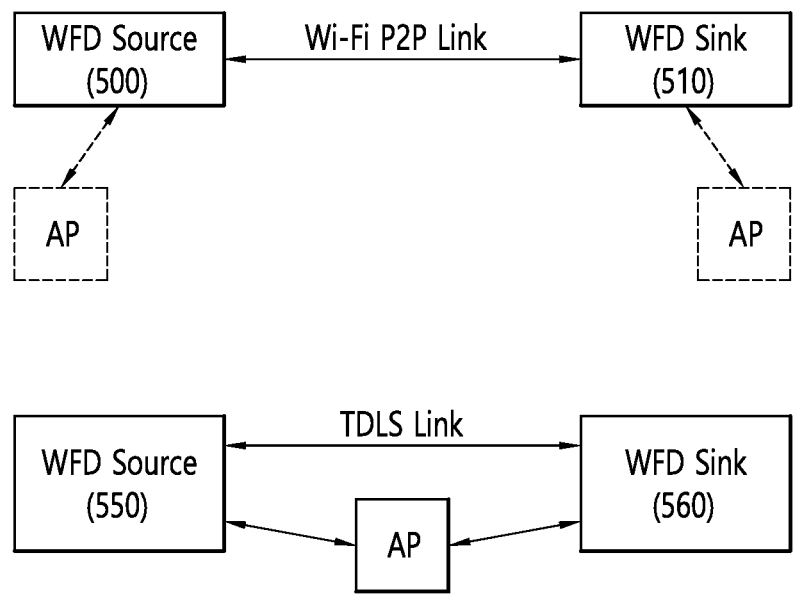
FIG. 5 is a conceptual view illustrating a network between a WFD source and a WFD sink.

FIG. 5 is a conceptual view illustrating a network between a WFD source and a WFD sink.

In the top of FIG. 5, a connection between a WFD source 500 and a WFD sink 510 based on the Wi-Fi P2P is disclosed, and in the bottom of FIG. 5, a connection between a WFD source 550 and a WFD sink 560 based on the TDLS link is disclosed.

As shown in the top of FIG. 5, the AP may be common or may be different in regard to the WFD source 500 and the WFD sink 510. Alternatively, the AP may not exist. When performing the WFD connection using the TDLS link as shown in the bottom of FIG. 5, the WFD source 550 and the WFD sink 560 need to maintain a connection with the same AP.

The WFD capability exchange and negotiation procedure may be performed after the WFD connection setup procedure between the WFD devices. Through the WFD capability exchange and negotiation, the WFD source and the WFD sink may mutually exchange at least one of codecs supported by each other, profile information of codecs, level information of codecs, and resolution information of codecs. The WFD capability exchange and negotiation may be performed by exchanging messages using Real-time Streaming Protocol (RTSP). Also, a set of parameters defining an audio/video payload during the WFD session may be determined. The WFD capability exchange and negotiation procedure may be performed by exchanges from RTSP M1 to RTSP M4 messages as shown in FIG. 6, which will be described later.

After the WFD exchange and negotiation procedure, the WFD session establishment procedure may be performed.

Figure 6:
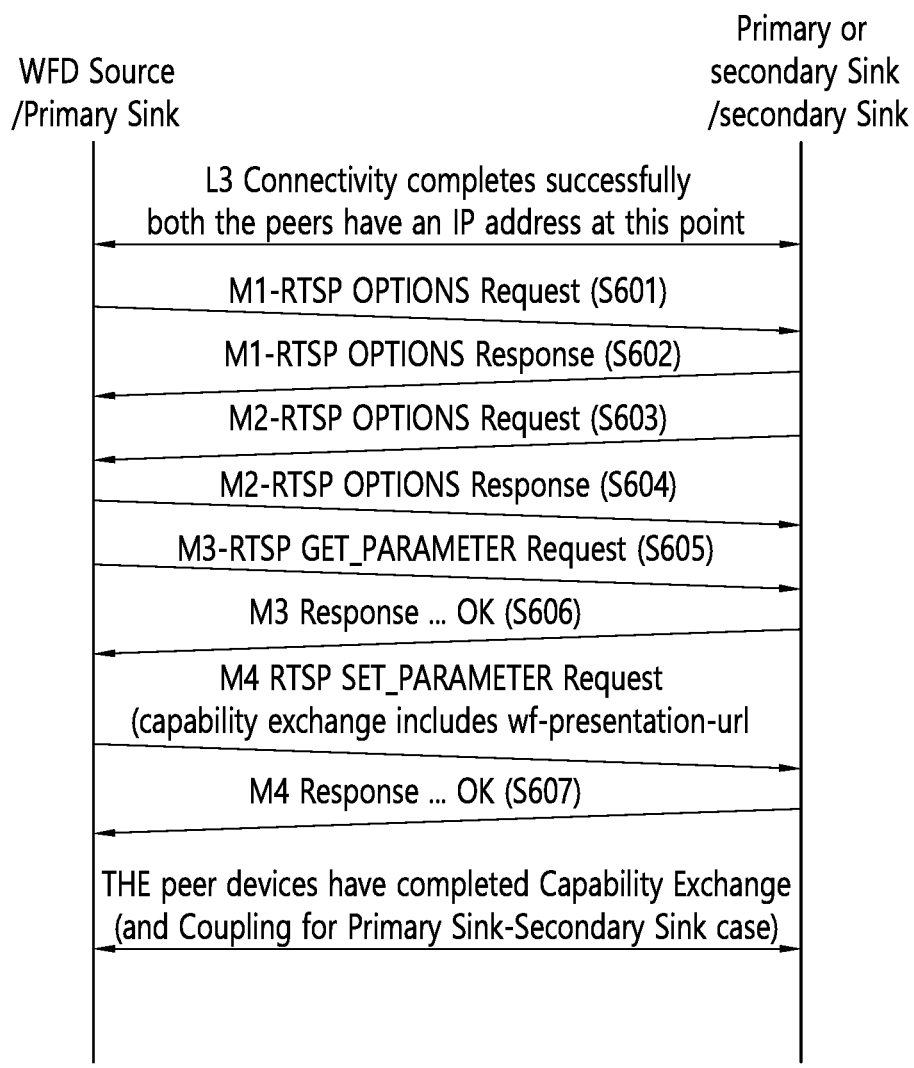
FIG. 6 is a conceptual view illustrating a WFD capability exchange and negotiation procedure.

FIG. 6 is a conceptual view illustrating a WFD capability exchange and negotiation procedure.

Referring to FIG. 6, the WFD source may send an RTSP M1 request message to initiate the RSTP procedure and the WFD capability negotiation (operation S601).

The RTSP M1 request message may include an RTSP options request to determine a set of RTSP methods supported by the WFD sink. The WFD sink receiving the RTSP M1 request message may transmit an RTSP M1 response message in which the RTSP methods that the WFD sink itself supports are enumerated (operation S602).

Thereafter, the WFD sink may send an RTSP M2 request message to determine a set of RTSP methods that the WFD source supports (operation S603).

When the RTSP M2 request message is received, the WFD source may respond with an RTSP M2 response message in which the RTSP methods that the WFD source itself supports are enumerated (operation S604).

The WFD source may send an RTSP M3 request message (RTSP GET_PARAMETER request message) specifying a list of WFD capabilities that the WFD source desires to know (operation S605).

When the RTSP M3 request message is received, the WFD sink may respond with an RTSP M3 response message (RTSP GET_PARAMETER response message) (operation S606).

Based on the RTSP M3 response message, the WFD source may determine an optimal set of parameters to be used during the WFD session, and may send an RTSP M4 request message (RTSP SET_PARAMETER request message) including the determined set of parameters to the WFD sink.

The WFD sink receiving the RTSP M4 request message may send an RTSP M4 response message (RTSP SET_PARAMETER response message) (operation S607).

Figure 7:
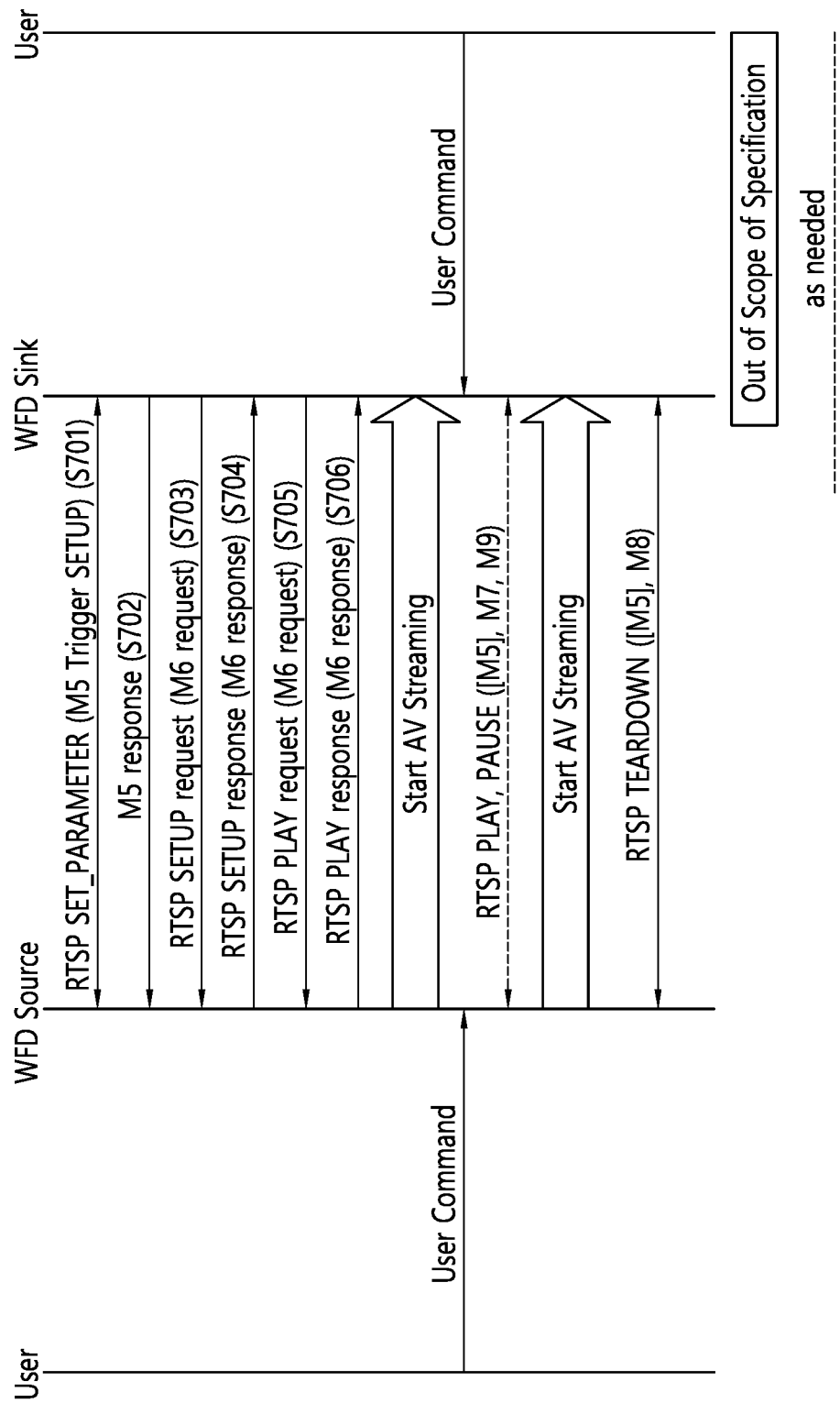
FIG. 7 is a conceptual view illustrating a WFD session establishment procedure.

FIG. 7 is a conceptual view illustrating a WFD session establishment procedure.

In FIG. 7, the WFD source/WFD sinks that have performed WFD capability exchange and negotiation may establish a WFD session. Specifically, the WFD source may transmit an RTSP SET parameter request message (RTSP M5 Trigger SETUP request) to the WFD sink (S701).

The WFD sink may send an RTSP M5 response message in response to the RTSP SET parameter request message (operation S702).

When the RTSP M5 message including a trigger parameter setup is successfully exchanged, the WFD sink may transmit an RTSP SETUP request message (RTSP M6 request) to the WFD source (operation S703).

When the RTSP M6 request message is received, the WFD source may respond with an RTSP SETUP response message (RTSP M6 response) (operation S704).

Successful establishment of the RTSP session may be instructed through the setting of the status code of the RTSP M6 response message.

After a successful exchange of the RTSP M6 message, the WFD sink may send an RTSP M7 request message to the source device to indicate that it is ready to receive the RTP stream (operation S705), and the WFD source may respond with an RTSP PLAY response message (RTSP M7 response message) (operation S706). Successful establishment of the WFD session may be instructed based on the status code of the RTSP PLAY response message.

After the WFD session is established, the WFD source transmits, to the WFD sink, an RTSP M3 request message (RTSP GET_PARAMETER request message) for acquiring capability for at least one RTSP parameter supported by the WFD sink, an RTSP M4 request message for setting at least one RTSP parameter value corresponding to the WFD session for capacity renegotiation between the WFD source and the WFD sink for Audio/Video (AV) formal renewal, an RTSP M5 request message for triggering the WFD sink to transmit an RTSP pause request message (RTSP M9 request message), an RTSP M12 request message for indicating that the WFD source enters WFD standby mode, an RTSP M14 request message for selecting input types to be used in a User Input Back Channel (UIBC), input device and other parameters, or an RTSP M15 request message for enabling or disabling the User Input Back Channel (UIBC). The WFD sink receiving the above-described RTSP request messages from the WFD source may respond with RTSP response messages.

Thereafter, the WFD sink may transmit, to WFD source, an RTSP M7 request message (RTSP PLAY request message) for starting (or resuming) audio/video streaming, an RTSP M9 request message (RTSP pause request message) for pausing audio/video streaming transmitted from the WFD source to the WFD sink, an RTSP M10 request message for requesting the WFD source to change an audio rendering device, an RTSP M11 request message indicating a change of the active connector type, an RTSP M12 request message indicating that the WFD sink has entered the WFD standby mode, an RTSP M13 request message for requesting the WFD source to refresh an Instantaneous Decoding Refresh (IDR), an RTSP M14 request message for selecting an input type to be used in the UIBC, input devices and other parameters, RTSP M15 request message for enabling or disabling the UIBC. The WFD source receiving the above-enumerated RTSP request messages from the WFD sink may respond with RTSP response messages.

When the WFD session is established and audio/video streaming begins, the WFD source and the WFD sink may proceed with audio/video streaming using codecs commonly supported by both of the WFD source and the WFD sink. As the codecs commonly supported by the WFD source and the WFD sink are used, the interoperability between the WFD source and the WFD sink may be guaranteed.

The WFD communication is based on the WFD IE, and the format of the WFD IE may be defined as shown in Table 1 below.

TABLE 1

| Field | Size (octets) | Value (Hexadecimal) | Description |
|---|---|---|---|
| Element ID | 1 | DD | IEEE 802.11 vendor specific usage |
| Length | 1 | Variable | Length of the following fields in the IE in octets. The length field is variable and set to 4 plus the total length of WFD subelements. |
| OUI | 3 | 50-6F-9A | WFA Specific OUI |
| OUI Type | 1 | 0A | Identifying the type or version of the WFD IE. Setting to 0x0A indicates WFA WFD v1.0 |
| WFD subelements | Variable | | One or more WFD subelements appear in the WFD IE |

Table 1 includes element ID field, length field, WFA-specific OUI field, OUI field indicating the type/version of WFD IE, and WFD subelement field. The WFD subelement field has a format as shown in Table 2 below.

TABLE 2

| Field | Size (octets) | Value (Hexadecimal) | Description |
|---|---|---|---|
| Subelement ID | 1 | | Identifying the type of WFD subelement. The specific value is defined in Table 5-3. |
| Length | 2 | Variable | Length of the following fields in the subelement |
| Subelements body field | Variable | | Subelement specific information fields |

The subelement ID may be defined as Table 3 below.

TABLE 3

| Subelement ID(Decimal) | Notes |
|---|---|
| 0 | WFD Device Information |
| 1 | Associated BSSID |
| 2 | WFD Audio Formats |
| 3 | WFD Video Formats |
| 4 | WFD 3D Video Formats |
| 5 | WFD Content Protection |
| 6 | Coupled Sink Information |
| 7 | WFD Extended Capability |
| 8 | Local IP Address |
| 9 | WFD Session Information |
| 10 | Alternative MAC Address |
| 11-255 | Reserved |

Referring to Table 3, the subelement ID field of one octet may indicate what information the WFD subelement contains. Specifically, the values of the subelement ID fields 0, 1, . . . , 10 may indicate that the subelements are WFD Device Information subelement, Associated BSSID subelement, WFD Audio Formats subelement, WFD Video Formats subelement, WFD 3D Video Formats subelement, WFD Content Protection subelement, Coupled Sink Information subelement, WFD Extended Capability subelement, Local IP Address subelement, WFD Session Information subelement, and Alternative MAC Address subelement, respectively. Here, the WFD Device Information subelement may include information necessary to decide whether to attempt to pair with the WFD device and create a session. The Associated BSSID subelement may be used to indicate the address of the currently associated AP. The WFD Audio Formats subelement, WFD Video Formats subelement, and WFD 3D Video Formats subelement may be used to indicate the capability of the WFD device related to audio, video, and 3D video, respectively. The WFD Content Protection subelement deliver information related to the content protection method, and the Coupled Sink Information subelement may deliver information about the state of the coupled sink, the MAC address, and the like. The WFD Extended Capability subelement is used to deliver various pieces of capability information of other WFD devices, and the Local IP Address subelement may be used to deliver an IP address to a WFD peer in the TDLS setup process. The WFD Session Information subelement may include information such as a list of WFD device information technicians in a WFD group. When the WFD connection method requires an interface (e.g., a MAC address) different from that used in the device discovery, the Alternative MAC Address subelement may deliver relevant information.

The User Input Back Channel (UIBC) may be a channel for transmitting a user input to a user interface present in the WFD sink to the WFD source. UIBC user inputs delivered through the UIBC may be packetized using a common packet header, and may be deliver over a Transmission Control Protocol (TCP)/Internet Protocol (IP). A user input category may include a generic category and a Human Interface Device Class (HIDC) category. The generic category (or an integrated category) may be used for a user input that is not dependent on a device being processed at an application level. A generic user input may have a format using a generic input body (or an integrated input body). The generic user input may include conceptual inputs such as zoom and scroll, as well as inputs such as mouse and keyboard events. The HIDC may be used for a user input generated by a human input device (HID) such as a remote control and a keyboard. An HIDC user input may have a format using an HIDC input body.

A key code supported by the existing UIBC may support only American standard code for information interchange (ASCII). In the existing WFD, when the key code not defined as ASCII is pressed through the user interface, the WFD sink may not transmit information on the key code to the WFD source through the UIBC.

For example, a case where Korean is input by pressing a Korean-English switching key (or a character switch button/a multi-lingual support button) for switching from English to Korean in order to input Korean through the user input device (or user interface) for the WFD sink may be assumed. In this case, the key code for Korean may not be transmitted to the WFD source through the UIBC. Therefore, the user switches the character input from English to Korean by pressing the Korean-English switching key, but keyboard screens of the WFD sink and the WFD source may continuously output a character input screen for inputting the English.

Therefore, hereinafter, in the embodiment of the present invention, a method for inputting characters other than English through the UIBC is disclosed. Other characters may be Korean. The WFD source may be represented by a term called a first WFD device and the WFD sink may be represented by a term called a second WFD device.

Table 4 given below discloses a UIBC parameter according to the embodiment of the present invention.

TABLE 4 wfd2-uibc-keyboard-character-switch-capability = "wfd2-uibc-Keyboard-character-switch-capabilily:" SP character-switch-type CRLF
character-switch-type = "none" / mode; "none" if Character Switch Mode is not supported at Keyboard
mode = 32*32HEXDIG; see table 2. table x-xx indicates one or more supported character-switch-type for character switch at a Keyboard
primary-character = 4*4HEXDIG; indicates value of primary character (e.g., English), basically primary character can be used first for UIBC
secondary-character = 4*4HEXDIG; indicates secondary character (e.g., Korean) secondary character can be used for UIBC when the user push the "character switch" button in primary character status
status = 4*4HEXDIG; indicates value of the current character status (Primary character or Secondary character). Status is toggled between primary character and secondary character whenever the user push the "character switch" button The wfd2-uibc keyboard-character-switch-capability may include information on a character-switch-type, a mode, a primary-character, a secondary-character, and a status as subparameters.

The character-switch-type may be none or the mode. When the character switch mode is not supported on the keyboard, the character switch type may be none. The mode may indicate one or more character-switch types for a character switch on the keyboard.

For example, the mode may indicate a possibility of changing between languages based on a plurality of bits as follows.

TABLE 5

| Bits | Description |
| --- | --- |
| 0 | Switch between English and Korean |
| 1 | Switch between English and Japanese |
| 2 | Switch between English and Chinese |
| 3 | Switch between English and German |
| 4 | Switch between English and French |
| 5 | Switch between English and Russian |
| 6:127 | — |

Referring to Table 5, information on a switchable language may be expressed based on each of a plurality of bits (e.g., 128 bits).

For example, a first bit (bit 0) indicates switching between English and Korean, a second bit (bit 1) indicates switching between English and Japanese, a third bit (bit 2) indicates switching between English and Chinese, a fourth bit (bit 3) indicates switching between English and German, a fifth bit (bit 4) indicates switching between English and French, and a sixth bit (bit 5) indicates switching between English and Russian. Referring to Table 5, 127 character switch types may be defined based on 127 bits.

The character switch mode supported by the user input device between the WFD source and the WFD sink may be negotiated based on the definition of the character switch type.

The primary-character may indicate a primary character (e.g., English). The primary-character may be a character preferentially established and transmitted through the UIBC.

The secondary-character may indicate a secondary character (e.g., Korean). The secondary-character may be established and transmitted below through the UIBC when the user presses "character change (alternatively, switch) in the primary character status.

The status may indicate a current character status (primary character or secondary character). The status may be toggled between the primary and secondary characters when the "character change" button is pressed.

As shown in Table 4, the wfd2-uibc keyboard-character-switch-capability is defined as a new parameter and information on the wfd2-uibc keyboard-character-switch-capability may be included in each of an RTSP M3 GET_PARAMETER request message and an RTSP M3 GET_PARAMETER response message to be used for the UIBC capability negotiation between the WFD source and the WFD sink. Based on the exchange of the wfd2-uibc keyboard-character-switch-capability parameters via this RTSP M3 message, information on the character switch type and the character switch mode supported by the keyboard connected to the WFD source and the WFD sink, respectively may be confirmed.

Further, based on the RTSP M4 SET_PARAMETER request message and the RTSP M14 SET_PARAMETER request message, the character switch type or the character switch mode to be transmitted through the UIBC in the WFD source and the WFD sink may be selected and changed.

In addition, according to the embodiment of the present invention, when the character switch button, which is the non-ASCII key, is pressed by the user, a message format for transferring user input data subjected to UIBC encapsulation, which indicate the character switching to a source WFD may be defined.

A new generic input message with a non-ASCII value that may indicate the character change to the message format for transmission of the UIBC encapsulated user input data to the source WFD.

Tables 6 and 7 below disclose the new generic input message with the non-ASCII value that may indicate the character switching.

TABLE 6

| Field | Size | Description |
| --- | --- | --- |
| Reserved | | Reserved |
| Key code 1 | | Key value defined for character switching |
| Key code 2 | | Required when the key value defined for the character switching is defined as a combination of two keys. When the character switch button is defined with one key value, a corresponding field is set to 0. |

In Table 6, when an operation of manually pressing the character switch button defined for the character switching with a hand is performed, the key code included in the transferred generic input message is disclosed.

Specifically, when the key value defined for the character switching is defined as one key, key code 1 may be defined. When the user presses the character switch button in the user interface associated with the WFD sink, key code 1 may be included in a generic input message as the UIBC encapsulated user input data and transferred to the source WFD.

As another example, key code 2 may be defined when the key value defined for the character switching is defined as the combination (e.g., Ctrl key+A) of two keys. When the user presses the character switch button in the user interface associated with the WFD sink, key code 2 may be included in a generic input message as the UIBC encapsulated user input data and transferred to the source WFD.

TABLE 7

| Field | Size | Description |
|---|---|---|
| Reserved | | Reserved |
| Key code 1 | | Key value defined for character switching |
| Key code 2 | | Required when the key value defined for the character switching is defined as a combination of two keys. When a character definition button is defined with one key value, a corresponding field is set to 0. |

In Table 7, when an operation of releasing the character switch button defined for the character switching from the hand is performed, the key code included in the transferred generic input message is disclosed.

Specifically, when the key value defined for the character switching is defined as one key, key code 1 may be defined. When the user presses the character switch button with the hand and thereafter, releases the hand from the character switch button in the user interface associated with the WFD sink, key code 1 may be included in the generic input message as the UIBC encapsulated user input data and transferred to the source WFD.

As another example, key code 2 may be defined when the key value defined for the character switching is defined as the combination (e.g., Ctrl key+A) of two keys. When the user presses the character switch button with the hand by the combination of two keys and thereafter, releases the hand from the character switch button in the user interface associated with the WFD sink, key code 2 may be included in the generic input message as the UIBC encapsulated user input data and transferred to the source WFD.

The key code included in the user input data may be a newly defined ASCII code or non-ASCII code for the character switch button.

A character type initially used in the user input device (or user interface) of the WFD sink (or WFD source) is defined as the primary character and other character type supported when the character switch button is pressed on the WFD sink (or WFD source) may be defined as the secondary character. That is, a character transferred through the UIBC through the user input device may be established as the primary character before the character switch button is pressed on the user input device. As described above, the status parameter of the wfd2-uibc keyboard-character-switch-capability parameter may be established as the primary character. Thereafter, when the character change button is pressed by the user, the status parameter of the wfd2-uibc keyboard-character-switch-capability parameter may be established as the secondary character. When the character change button is pressed by the user again, the status parameter of the wfd2-uibc keyboard-character-switch-capability parameter may be established as the primary character again. That is, the status parameter may be toggled between the primary and secondary characters whenever the character switch button is pressed by the user.

Figure 8:
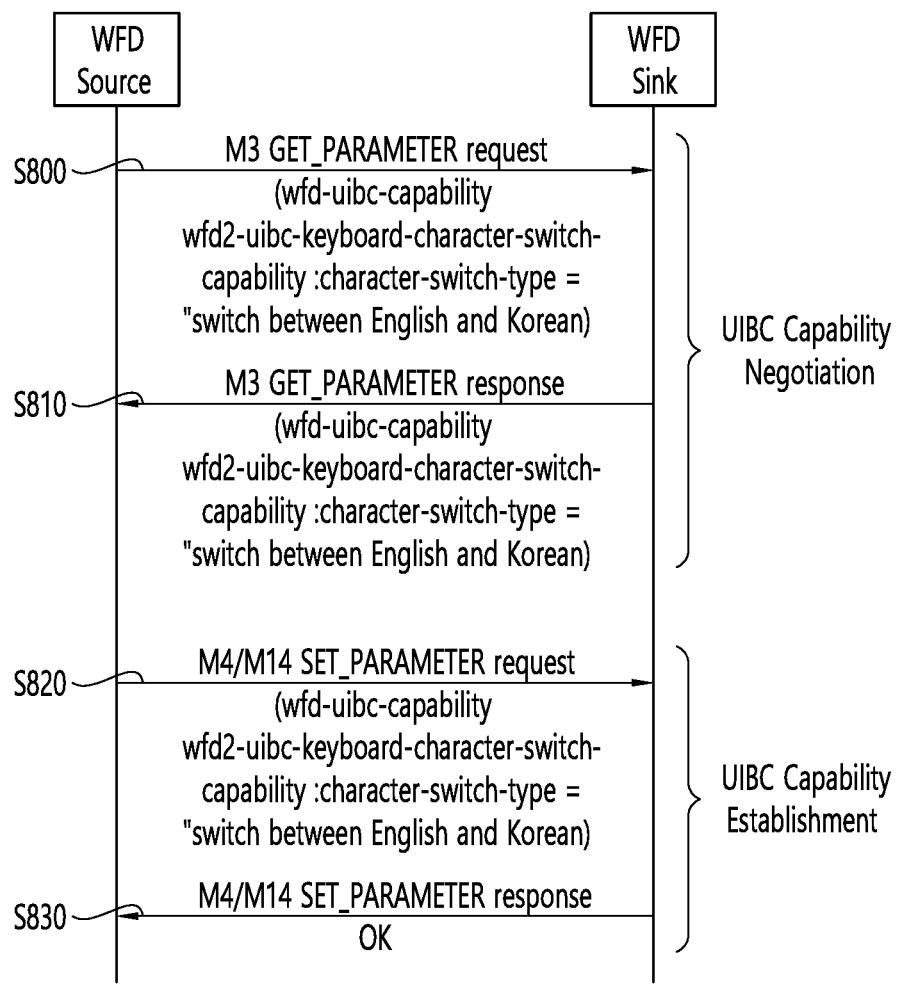
FIG. 8 is a conceptual view illustrating a UIBC capability negotiation and a UIBC capability establishment according to an embodiment of the present invention.

FIG. 8 is a conceptual view illustrating a UIBC capability negotiation and a UIBC capability establishment according to an embodiment of the present invention.

In FIG. 8, procedures for the UIBC capability negotiation and the UIBC capability establishment between the WFD source and the WFD sink are disclosed.

Referring to FIG. 8, the WFD source may transmit the RTSP M3 Request message to the WFD Sink (step S800).

The WFD source may transmit the RTSP M3 request message (RTSP GET_PARAMETER request message) and the RTSP M3 request message may include the wfd2-uibc keyboard-character-switch-capability parameter.

For example, the character switch type parameter included in the wfd2-uibc keyboard-character-switch-capability parameter transmitted to the WFD sink through the WFD source may be established as switch between English and Korean when the user input device connected to the WFD source supports switch between English and Korean.

When the RTSP M3 request message is received, the WFD sink may respond with an RTSP M3 response message (RTSP GET_PARAMETER response message) (step S810).

Similarly, the RTSP M3 response message may also include the wfd2-uibc keyboard-character-switch-capability parameter. For example, the character switch type parameter included in the wfd2-uibc keyboard-character-switch-capability parameter transmitted to the WFD source through the WFD sink may be established as switch between English and Korean when the user input device connected to the WFD sink supports switch between English and Korean.

The UIBC capability negotiation procedure may be performed based on the exchange of the RTSP M3 request message and the RTSP M3 response message described above. After the UIBC capability negotiation procedure, a UIBC capability establishment procedure may be performed. That is, after the mutual negotiation for the character switch capability between the WFD sink and the WFD source is performed, an actual establishment procedure for the character switch may be performed based on the RTSP M4/M14 request message and the RTSP M4/M14 response message.

The WFD source may transmit the RTSP M4/M14 Request message to the WFD Sink (step S820).

The WFD source may transmit the RTSP M4 SET_PARAMETER request message and/or the RTSP M14 request message to the WTSD M4 request message to the WFD sink for the actual establishment of the character switch between the WFD sink and the WFD source after the UIBC capability negotiation procedure based on the RTSP M3 message.

The RTSP M4 Request message and the RTSP M14 Request message may include the wfd2-uibc keyboard-character-switch-capability parameter for establishing the character switch.

The WFD sink may transmit the RTSP M4/M14 request message to the WFD source (step S830).

The WFD sink may transmit an agreement to the character switch establishment of the WFD source via an RTSP M4/M14 response message.

On the contrary, the WFD sink may transmit the RTSP M4/M14 request message to the WFD source and the WFD source may transmit the RTSP M4/M14 response message to the WFD sink.

Figure 9:
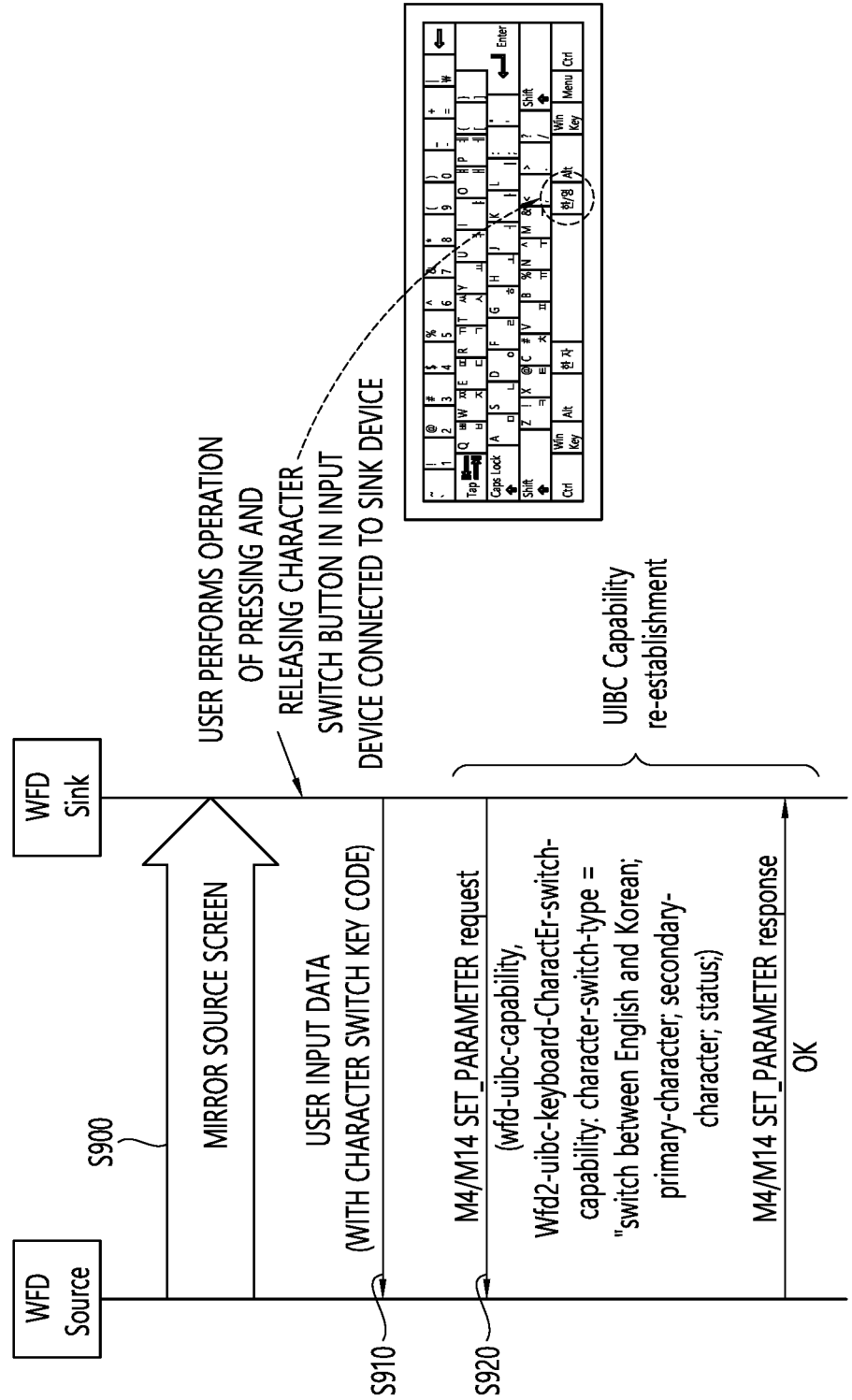
FIG. 9 is a conceptual view illustrating a method for switching a character through a user input device of a WFD sink according to an embodiment of the present invention.

FIG. 9 is a conceptual view illustrating a method for switching a character through a user input device of a WFD sink according to an embodiment of the present invention.

Referring to FIG. 9, after the WFD capability establishment procedure, when the character switch button of the user input device connected to the WFD sink is pressed and released to change the type of the character input through the user input device connected to the WFD sink, a message transmission operation between the WFD sink and the WFD source is disclosed.

Referring to FIG. 9, a screen of the WFD source may be mirrored to the screen of the WFD sink (step S900).

When the character switch button is pressed in the WFD sink, the user input data including the key code for the character switch button may be transmitted from the WFD sink to the WFD source (step S910).

Specifically, in the case where the user presses and releases the character switch button in the user input device connected to the WFD sink, when the user presses and releases the character switch button, the key code corresponding to the character switch button from the WFD sink to the WFD source may be transmitted while being included in the UIBC-capsulated user input data.

Thereafter, for the UIBC capability re-establishment procedure, the WFD sink may transmit the wfd2-uibc keyboard-character-switch-capability parameter containing the changed information via the RTSP M4/RTSP M14 request message (step S920).

Specifically, when the character switch button is an English/Korean switch key, the status parameter of the wfd2-uibc keyboard-character-switch-capability parameter may be switched from English to Korean.

According to another embodiment of the present invention, a modified wfd-uibc-capability parameter acquired by modifying a previously defined wfd-uibc-capability parameter is transmitted through the RTSP M3 request message and the RTSP M3 response message, and as a result, a negotiation for a character switch capability (or UIBC capability) may be performed. Table 8 below discloses the modified wfd-uibc-capability parameter.

TABLE 8 wfd-uibc-capability = "wfd-uibc-capability:" SP ...
...
inp-type = ("Keyboard" SP character-switch-type) / ...
character-switch-type = "none" / mode; "none" if not supported at Keyboard
mode = 32*32HEXDIG; see table 2. table x-xx indicates one or more supported character-switch-type for character switch at a Keyboard
primary-character = 4*4HEXDIG; indicates value of primary character (e.g., English), basically primary character can be used first for UIBC
secondary-character = 4*4HEXDIG; indicates secondary character (e.g., Korean) secondary character can be used for UIBC when the user push the "character switch" button in primary character status
status = 4*4HEXDIG; indicates value of the current character status (Primary character or Secondary character). Status is toggled between primary character and secondary character whenever the user push the "character switch" button Referring to Table 8, the modified wfd-uibc-capability parameter may include the "keyboard" SP character-switch-type (mode), mode, primary-Secondary characters, and status as the parameter for the character switch.

The negotiation for the character switch type or character switch mode may be performed, which is supported in the keyboard between the WFD source and the WFD sink based on the modified wfd-uibc-capability parameter transmitted via the RTSP M3 request message/RTSP M3 response message.

In addition, establishment and re-establishment for the character switch type or character switch mode may be performed, which is supported in the keyboard between the WFD source and the WFD sink based on the modified wfd-uibc-capability parameter transmitted via the RTSP M4 request message/RTSP M14 response message.

Figure 10:
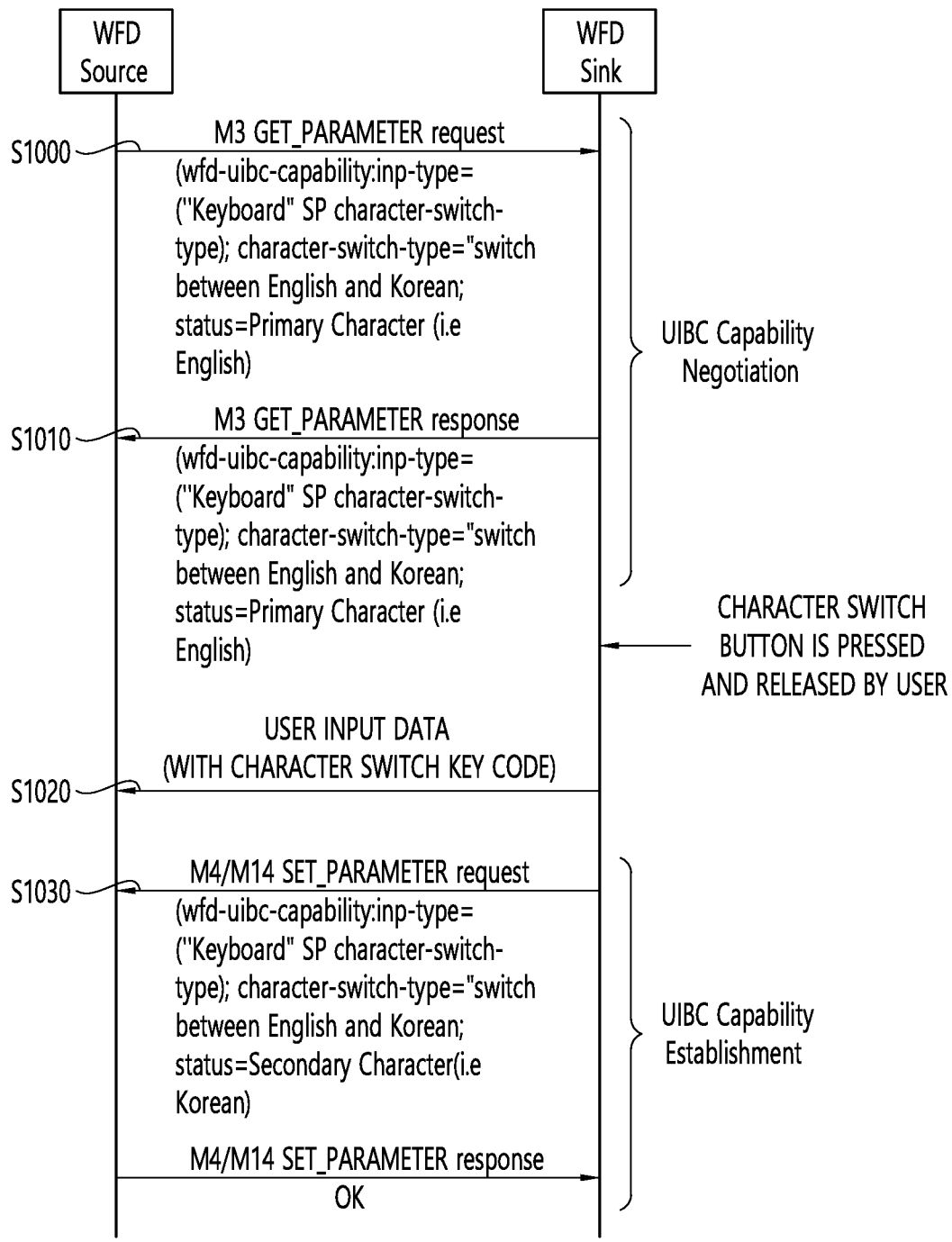
FIG. 10 is a conceptual view illustrating a UIBC capability negotiation and a UIBC capability establishment according to an embodiment of the present invention.

FIG. 10 is a conceptual view illustrating a UIBC capability negotiation and a UIBC capability establishment according to an embodiment of the present invention.

In FIG. 10, the UIBC capability negotiation and UIBC capability establishment based on the modified wfd-uibc-capability parameter are disclosed.

Referring to FIG. 10, the WFD source may transmit the RTSP M3 request message to the WFD sink (step S1000).

The RTSP M3 request message transmitted by the WFD source may include the modified wfd-uibc-capability parameter described above.

When inp type is the "keyboard" SP character-switch type, the mode, the primary character, the secondary character, and the status may be included as the parameter of the WFD source for the character switch. In this case, the status may be established as the primary character (e.g., English).

The WFD sink may transmit the RTSP M3 response message to the WFD source (step S1010).

The RTSP M3 response message transmitted by the WFD sink may include the modified wfd-uibc-capability parameter described above.

Similarly, when inp type is the "keyboard" SP character-switch type, the mode, the primary character, the secondary character, and the status may be included as the parameter of the WFD sink for the character switch. In this case, the status parameter included in the modified wfd-uibc-capability parameter may be established to the primary character (e.g., English).

If the user presses the character switch button via the user input device connected to the WFD sink, the WFD sink may transmit the RTSP M4/RTSP M14 request message to the WFD source (step S1020).

The WFD sink RTSP M4/RTSP M14 request message may include the modified wfd-uibc-capability parameter. The status parameter included in the modified wfd-uibc-capability parameter may be established to the secondary character (e.g., Korean).

The WFD source may transmit the RTSP M4/M14 response message to the WFD sink (step S1030).

Figure 11:
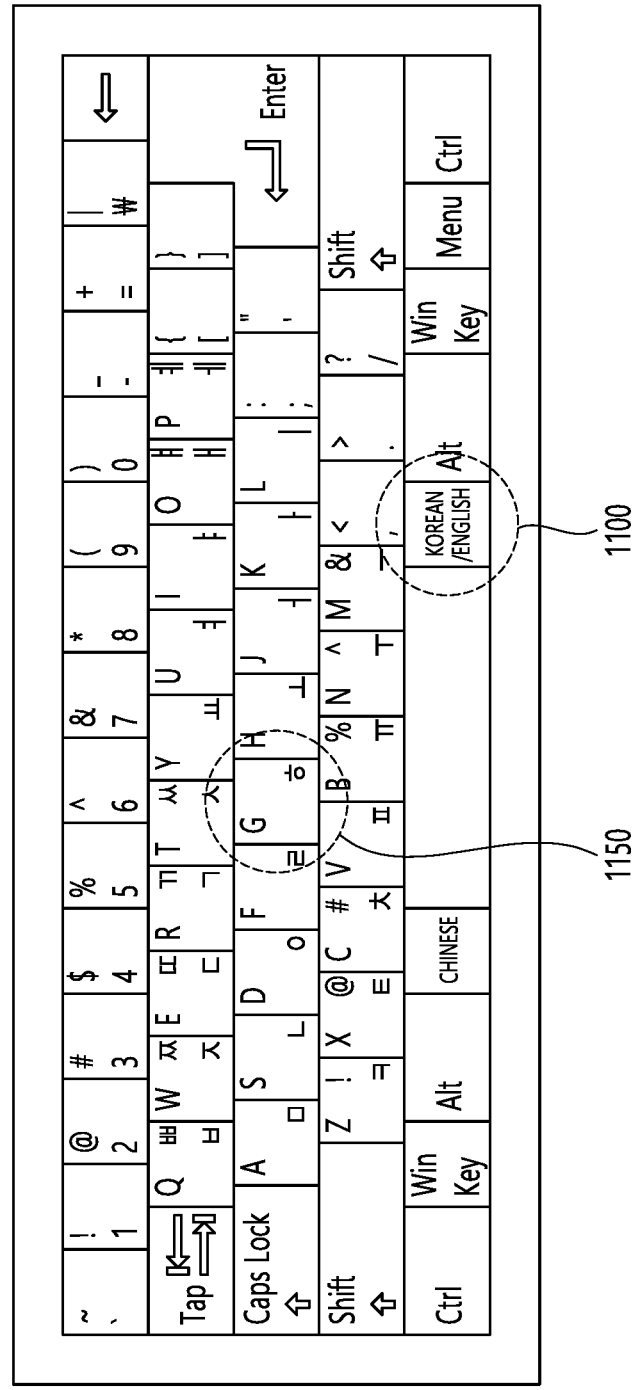
FIG. 11 illustrates an operation after pressing a character switch button through a keyboard according to an embodiment of the present invention.

FIG. 11 illustrates an operation after pressing a character switch button through a keyboard according to an embodiment of the present invention.

In FIG. 11, it is assumed that English is established as the primary character through the negotiation procedure based on the RTSP M3 request message/RTSP M3 response message, Korean is established as the secondary character, and the status parameter is established to English.

Referring to FIG. 11, the character switch button (e.g., Korean/English button) may be pressed and then, released in the keyboard as the user input device of the WFD sink device. In this case, the key code corresponding to the character switch button may be transferred through the UIBC.

After the key code corresponding to the character switch button is transferred via the UIBC, the WFD sink may transmit the modified wfd-uibc-capability parameter (or wfd2-uibc keyboard-character-switch-capability parameter) via the RTSP M4/M14 request message.

The status parameter of the wfd-uibc-capability parameter (or wfd2-uibc keyboard-character-switch-capability parameter) included in the RTSP M4/M14 request message may be established to English.

The WFD source may receive the RTSP M4/M14 response message in response to the RTSP M4/M14 request message.

Thereafter, when "G(g)" is pressed by the user input device of the WFD sink, "ㅎ" corresponding to G(g) may be output to a character input window and a character input display.

As described above, according to the embodiment of the present invention, when the character switch button for multi-lingual support is pressed and released by the user, the UIBC encapsulated user input data for instructing the character switch may be transferred to the WFD source. A new comprehensive input message field including the key code corresponding to the character switch button may be defined as shown in Tables 9 and 10 below.

TABLE 9

| Field | Size | Description |
|---|---|---|
| Reserved | | Reserved |
| Key code 1 | | Key value defined for switch to "Korean" |
| Key code 2 | | Key value defined for switch to "English" |

In Table 9, when an operation (key down operation) of pressing the character switch button defined for the character switch is performed, the key code included in the transferred generic input message is disclosed.

Specifically, in a state in which Korean is supported on the current screen, the user may press a Korean/English switch key which is the character switch button of the user input device connected to the WFD sink. In this case, the generic input message including key code 2 may be transmitted from the WFD sink to the WFD source via the UIBC. An RTSP M4 request message/RTSP M14 request message including the modified wfd-uibc-capability parameter (or wfd2-uibc keyboard-character-switch-capability parameter) whose status parameter is established to English may be thereafter transmitted as described above.

On the contrary, in the state in which English is supported on the current screen, the user may press the Korean/English switch key which is the character switch button of the user input device connected to the WFD sink. In this case, the generic input message including key code 1 may be transmitted from the WFD sink to the WFD source via the UIBC. An RTSP M4 request message/RTSP M14 request message including the modified wfd-uibc-capability parameter (or wfd2-uibc keyboard-character-switch-capability parameter) whose status parameter is established to Korean may be thereafter transmitted as described above.

TABLE 10

| Field | Size | Description |
|---|---|---|
| Reserved | | Reserved |
| Key code 1 | | Key value defined for switch to "Korean" |
| Key code 2 | | Key value defined for switch to "English" |

In Table 10, when an operation (key up operation) of releasing the character switch button defined for the character switch is performed, the key code included in the comprehensive input message field of the transferred user input data is disclosed.

Specifically, in the state in which Korean is supported on the current screen, the user may press and then, release the Korean/English switch key which is the character switch button of the user input device connected to the WFD sink. In this case, the user input data including the comprehensive input message field including key code 2 may be transmitted from the WFD sink to the WFD source via the UIBC. The RTSP M4 request message/RTSP M14 request message including the modified wfd-uibc-capability parameter (or wfd2-uibc keyboard-character-switch-capability parameter) whose status parameter is established to English may be thereafter transmitted as described above.

On the contrary, in the state in which English is supported on the current screen, the user may press and then, release the Korean/English switch key which is the character switch button of the user input device connected to the WFD sink. In this case, the generic input message including key code 1 may be transmitted from the WFD sink to the WFD source via the UIBC. The RTSP M4 request message/RTSP M14 request message including the modified wfd-uibc-capability parameter (or wfd2-uibc keyboard-character-switch-capability parameter) whose status parameter is established to Korean may be thereafter transmitted as described above.

The key code included in the user input data may be a newly defined ASCII code for the character switch or a non-ASCII code defined for the character switch.

A new comprehensive input message field including the key code corresponding to the character switch button may be defined as shown in Tables 11 and 12 below. Tables 11 and 12 disclose the key codes defined for the character switch button for switching between English and Japanese.

TABLE 11

| Field | Size | Description |
|---|---|---|
| Reserved | | Reserved |
| Key code 1 | | Key value defined for switch to "Japanese" |
| Key code 2 | | Key value defined for switch to "English" |

In Table 11, when a Japanese/English switch key is pressed (key down), the key code transferred through the UIBC is disclosed.

TABLE 12

| Field | Size | Description |
|---|---|---|
| Reserved | | Reserved |
| Key code 1 | | Key value defined for switch to "Japanese" |
| Key code 2 | | Key value defined for switch to "English" |

In Table 12, when the Japanese/English switch key is pressed and then, released (key up), the key code transferred through the UIBC is disclosed.

Figure 12:
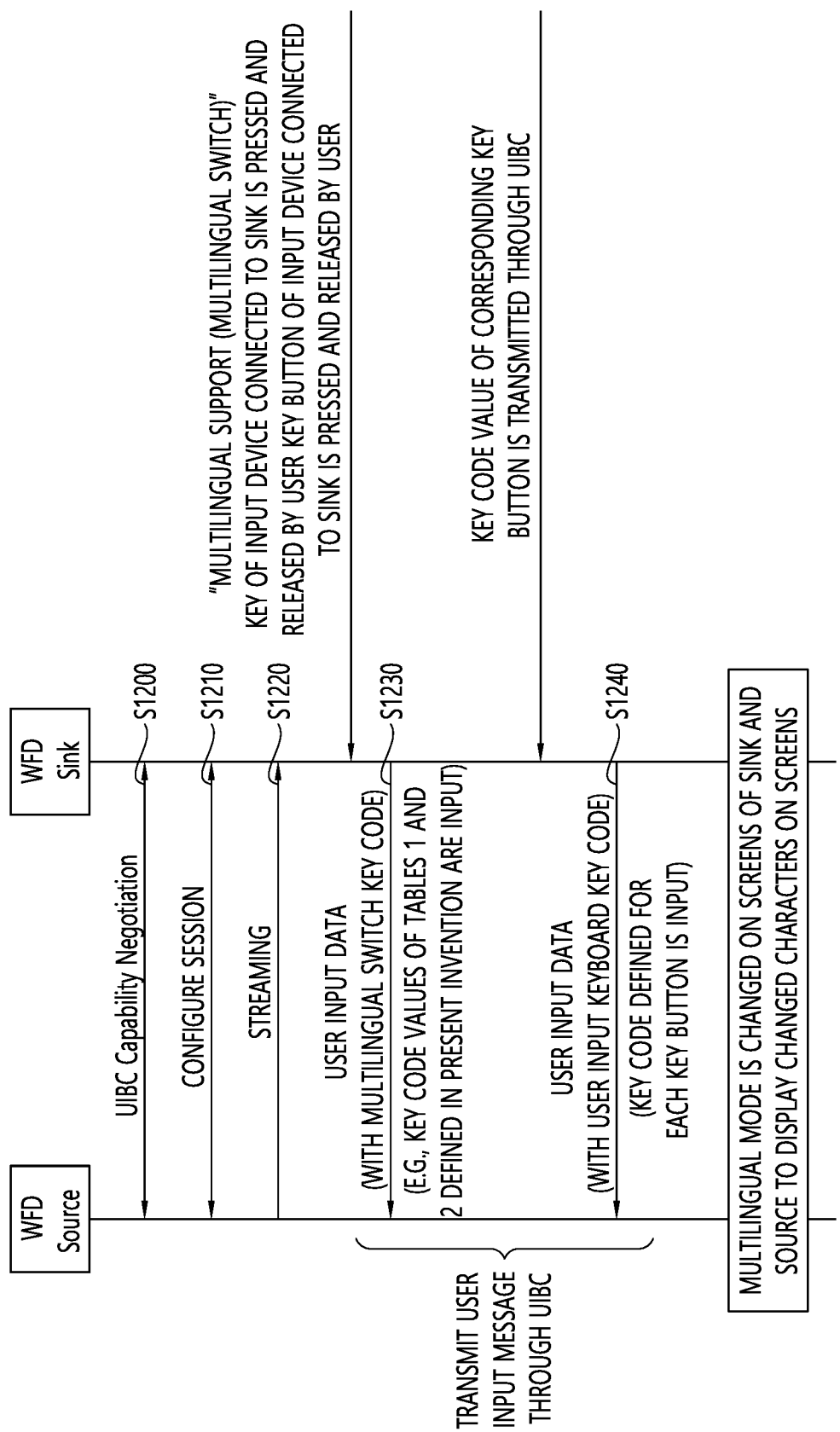
FIG. 12 is a flowchart illustrating a method for announcing multi-lingual mode witching through a UIBC according to an embedment of the present invention.

FIG. 12 is a flowchart illustrating a method for announcing multi-lingual mode witching through a UIBC according to an embedment of the present invention.

In FIG. 12, a method of switching an input language through the multi-lingual switch key (e.g., Korean/English key) is disclosed.

Referring to FIG. 12, the UIBC capability negotiation procedure is performed between the WFD sink and the WFD source (step S1200).

The UIBC capability negotiation procedure may be performed based on the RTSP M3 request message/RTSP M3 response message as described above.

A session configuration procedure is performed between the WFD sink and the WFD source (step S1210).

Video data of the WFD source may be streamed on the display of the WFD sink (step S1220).

The multi-lingual support (multi-lingual switch) key of the user input device connected to the WFD sink may be pressed and then, released by the user (step S1230).

The WFD sink may transmit the user input data including the multi-lingual key code to the WFD source (step S1240).

The user input data including the key codes defined in Tables 9 to 12 above may be transmitted.

Thereafter, the user may input the switched character by pressing the key button of the user input device connected to the WFD sink and the key code corresponding to the switched character of the user may be transmitted while being included in the user input data.

That is, on the screens of the WFD sink and the WFD source, characters of the switched language may be output.

Figure 13:
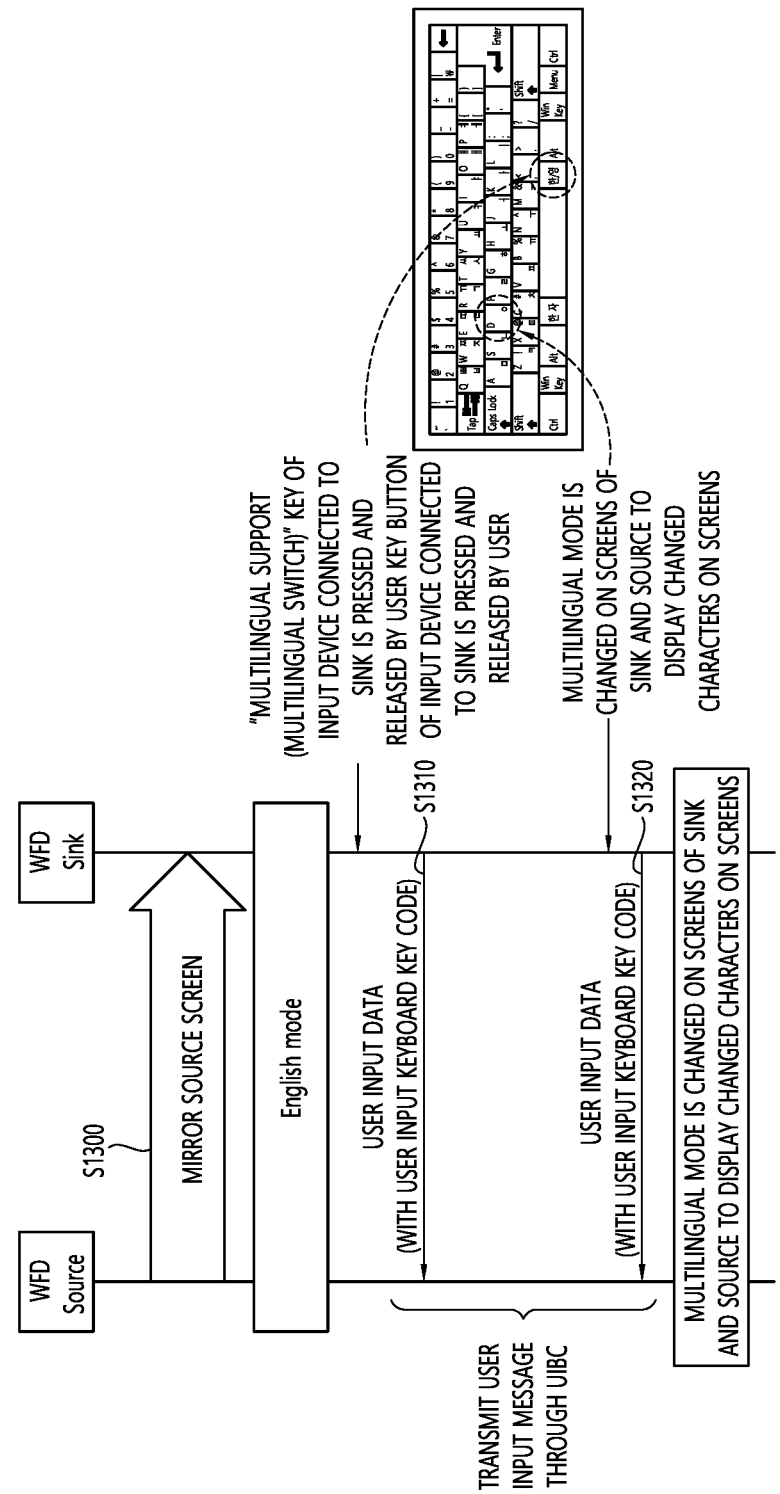
FIG. 13 is a flowchart illustrating a method for announcing multi-lingual mode witching through a UIBC according to an embedment of the present invention.

FIG. 13 is a flowchart illustrating a method for announcing multi-lingual mode witching through a UIBC according to an embedment of the present invention.

In FIG. 13, the method of switching the input language through the multi-lingual switch key (e.g., Korean/English key) is disclosed. In FIG. 13, in particular, a method for switching from an English mode to a Korean mode, in which English is input, is disclosed.

Referring to FIG. 13, the video data of the WFD source may be output on the screen of the WFD sink through mirroring (step S1300).

The English mode in which an English alphabet, which is the primary character, is input in an initial state may be established and English may be input and output through the user input device.

The Korean/English key which is the multi-lingual switch key of the user input device connected to the WFD sink may be pressed and then, released by the user.

The WFD sink may transmit the user input data including the key code of the Korean/English key which is the multi-lingual switch to the WFD source (step S1310).

The user input data including the key codes defined in Tables 9 to 12 above may be transmitted.

Thereafter, the user may input the switched character by pressing the key button of the user input device connected to the WFD sink and the key code corresponding to the switched character of the user may be transmitted while being included in the user input data (step S1320).

That is, Korean may be input through the user input device of the WFD sink and Korean may be output through the screen of the WFD sink/WFD source.

According to another embodiment of the present invention, disclosed is a method in which the wfd2-uibc-multilingual-support parameter is defined and the RSTP message including the wfd2-uibc-multilingual-support parameter is transmitted to the WFD source whenever the character switch button for multilingual support is pressed by the user.

TABLE 13 wfd2-uibc-multilingual-support = "wfd2-uibc-multilingual-support:" SP
multilingual-support-mode CRLF
multilingual-support-mode = "none"/mode; "none" if multilingual
Support Mode is not supported at Keyboard
mode = 32*32HEXDIG; see table 2. table 2 indicates one or
more multilingual-support-mode for mode switch at a Keyboard
primary-mode = 4*4HEXDIG; indicates value of primary
mode (e.g., English), basically primary mode can be used first for UIBC
secondary-mode = 4*4HEXDIG; indicates secondary mode (e.g.,
Korean) secondary mode is activated when the user push the "Multilingual
Support" button on the user's Keyboard in primary mode
status = 4*4HEXDIG; indicates value of the current multilingual
support mode (Primary mode or Secondary mode). Status is toggled
between primary mode and secondary mode whenever the user push the
"Multilingual Support" button on the Keyboard.

Table 13 discloses the parameters included in the newly defined wfd2-uibc-multilingual-support parameter. Each parameter may have the following meaning.

The multilingual-supported mode may be none or a mode. When the multilingual support mode is not supported on the keyboard, the multilingual-support parameter may be none.

The mode may indicate one or more multilingual support modes for mode switch on the keyboard. Table 14 below is a table defining a multilingual-support-mode list supported by the user input device.

TABLE 14

| Bits | Description |
| --- | --- |
| 0 | Switch between English and Korean |
| 1 | Switch between English and Japanese |
| 2 | Switch between English and Chinese |
| 3 | Switch between English and German |
| 4 | Switch between English and French |
| 5 | Switch between English and Russian |
| 6:127 | — |

Based on a selected value among values defined as shown in Table 14, the mode of the wfd2-uibc-multilingual-support parameter included in the RTSP M3/4/14 message in which the WFD source and the WFD sink are transmitted via the UIBC capability negotiation procedure and the UIBC capability establishment/re-establishment negotiation procedure may be established.

The primary-mode may indicate the primary character (e.g., English). The primary-character may be a character preferentially established and transferred on through the UIBC.

The secondary-mode may indicate the secondary character (e.g., Korean). When the secondary-mode may be activated when the user presses a "multilingual support" button in a primary mode state.

The status may indicate a current character status (primary character or secondary character). The status may be toggled between the primary and secondary characters when the "multilingual support" button is pressed.

Figure 14:
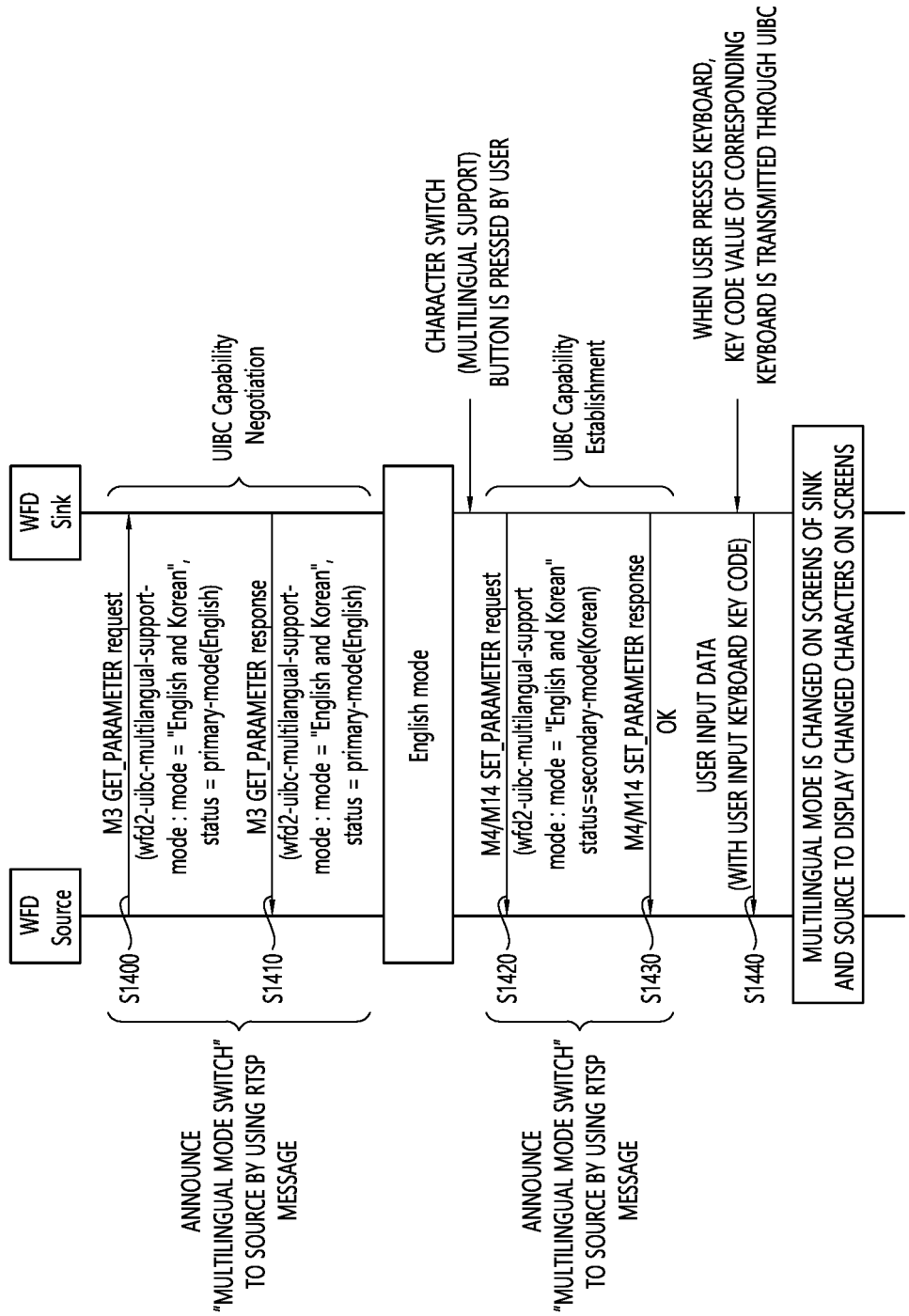
FIG. 14 is a conceptual view illustrating a UIBC capability negotiation and a UIBC capability establishment according to an embodiment of the present invention.

FIG. 14 is a conceptual view illustrating a UIBC capability negotiation and a UIBC capability establishment according to an embodiment of the present invention.

In FIG. 14, the procedures for the UIBC capability negotiation and the UIBC capability establishment between the WFD source and the WFD sink are disclosed.

Referring to FIG. 14, the WFD source may transmit the RTSP M3 Request message to the WFD sink (step S1400).

The WFD source may transmit the RTSP M3 request message (RTSP GET_PARAMETER request message) and the RTSP M3 request message may include the wfd2-uibcmultilingual-support parameter. The mode of the wfd2-uibc-multilingual-support parameter may be established as the switch between English and Korean and the status is established to English to announce UIBC associated capability information of the WFD source to the WFD sink.

The WFD sink may transmit the RTSP M3 response (RTSP GET_PARAMETER response message) and the RTSP M3 response message may include the wfd2-uibc-multilingual-support parameter (step S1410).

Similarly, the mode of the wfd2-uibc-multilingual-support parameter may be established as the switch between English and Korean and the status may be established to English which is the primary mode. The WFD sink may announce the UIBC associated capability information to the WFD source through the RTSP M3 message.

According to the embodiment of the present invention, after the execution of the UIBC capability negotiation procedure, the English mode may be established and thereafter, when the multilingual support button is pressed, the primary mode may be changed to the secondary mode. When the multilingual support button is pressed, the user may transmit the wfd2-uibc-multilingual-support parameter. In this case, the status of the wfd2-uibc-multilingual-support parameter may be established to Korean which is the secondary mode. The WFD source may transmit the RTSP M4/M14 response message to the WFD sink in response to the RTSP M4/M14 request message.

On the contrary, the WFD source transmits the wfd2-uibc-multilingual-support parameter via the M4/M14 request message for the UIBC capability establishment procedure (step S1420) and the WFD sink may transmit the M4/M14 response message to the WFD source in response to the M4/M14 request message (step S1430).

Thereafter, when the user presses the key of the user input device connected to the WFD sink, the WFD sink may transmit the key code corresponding to the key of the switched language (e.g., Korean) included in the user input data to the WFD source (step S1440).

According to another embodiment of the present invention, the modified wfd-uibc-capability parameter acquired by modifying the previously defined wfd-uibc-capability parameter is transmitted through the RTSP M3 request message and the RTSP M3 response message, and as a result, the negotiation for the multilingual support capability (or UIBC capability) may be performed. Further, the multilingual support mode may be established and changed based on the RTSP M4 request message and the RTSP M14 request message.

Table 15 below discloses the modified wfd-uibc-capability parameter.

TABLE 15 wfd-uibc-capability = "wfd-uibc-capability:" SP . . .
. . .
inp-type = ("Keyboard" SP multilingual-support-mode)/. . .
multilingual-support-mode = "none"/mode; "none" if multilingual Support Mode is not supported at Keyboard
mode = 32*32HEXDIG; see table 2. table 2 indicates one or more multilingual-support-mode for mode switch at a Keyboard
primary-mode = 4*4HEXDIG; indicates value of primary mode (e.g., English), basically primary mode can be used first for UIBC
secondary-mode = 4*4HEXDIG; indicates secondary mode (e.g., Korean) secondary mode is activated when the user push the "Multilingual Support" button on the user's Keyboard in primary mode TABLE 15-continued status = 4*4HEXDIG; indicates value of the current multilingual support mode (Primary mode or Secondary mode). Status is toggled between primary mode and secondary mode whenever the user push the "Multilingual Support" button on the Keyboard.

Referring to Table 15, the modified wfd-uibc-capability parameter may include the "multilingual support mode, the mode, the primary mode, the secondary modem, and the status as the parameters for multilingual mode switch. Each parameter included in the modified wfd-uibc-capability parameter may be the same as described in Table 13.

Figure 15:
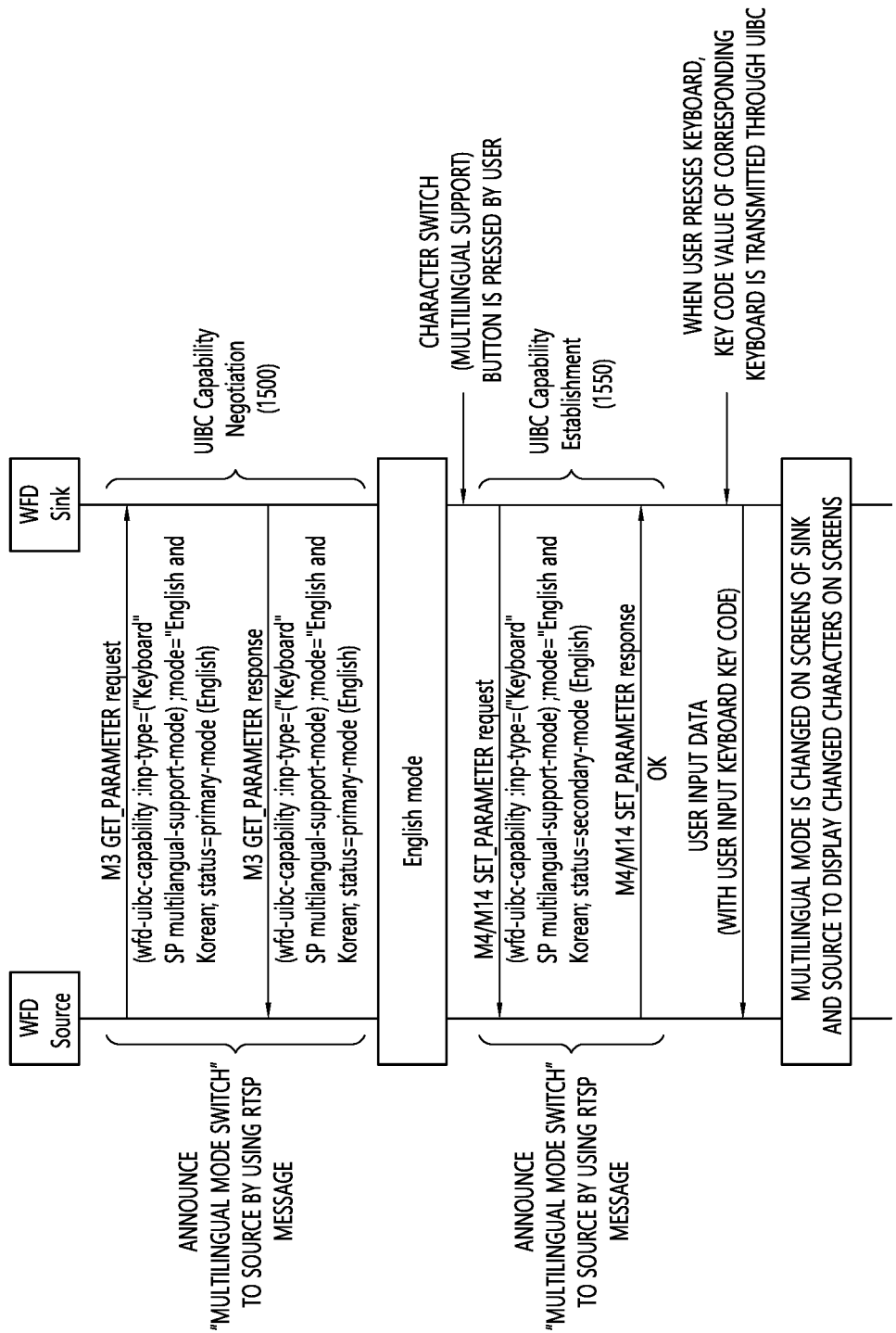
FIG. 15 is a flowchart illustrating a multi-lingual mode switching method based on a modified wfd-uibc-capability parameter according to an embodiment of the present invention.

FIG. 15 is a flowchart illustrating a multi-language mode switching method based on a modified wfd-uibc-capability parameter according to an embodiment of the present invention.

A UIBC capability negotiation procedure 1500 between the WFD source and the WFD sink may be performed based on the modified wfd-uibc-capability parameter transmitted via the RTSP M3 request message/RTSP M3 response message. In this case, based on the parameter information (e.g., "Keyboard" SP multilingual-support-mode) of the multilingual mode switching capability included in the modified wfd-uibc-capability parameter, the negotiations for the character switch type and the character switch mode supported in the keyboard may be together performed.

For example, the mode parameter included in the modified wfd-uibc-capability parameter of each of the RTSP M3 request message/RTSP M3 response message may indicate the switch between English and Korean and the status may indicate English which is the primary mode.

When the character switch button (or multilingual support button) is pressed by the user, a UIBC capability establishment procedure 1550 may be performed based on the RTSP M4 request message/RTSP M14 request message by the WFD sink.

The RTSP M4 request/RTSP M14 request message may include the modified wfd-uibc-capability parameter and the modified wfd-uibc-capability parameter may include parameter information on a multilingual mode switching capability for establishing the UIBC capability. Specifically, the mode parameter included in the modified wfd-uibc-capability parameter of each of the RTSP M4 request message/RTSP M14 request message may indicate the switch between English and Korean and the status may indicate Korean which is the secondary mode.

The WFD source may transmit the RTSP M4/M14 response message to the WFD sink.

When the user presses the keyboard connected to the WFD sink, the key code of Korean corresponding to the keyboard may be transmitted to the WFD source through the UIBC.

After changing to Korean mode, Korean may be output on the screens of the WFD sink and the WFD source.

Figure 16:
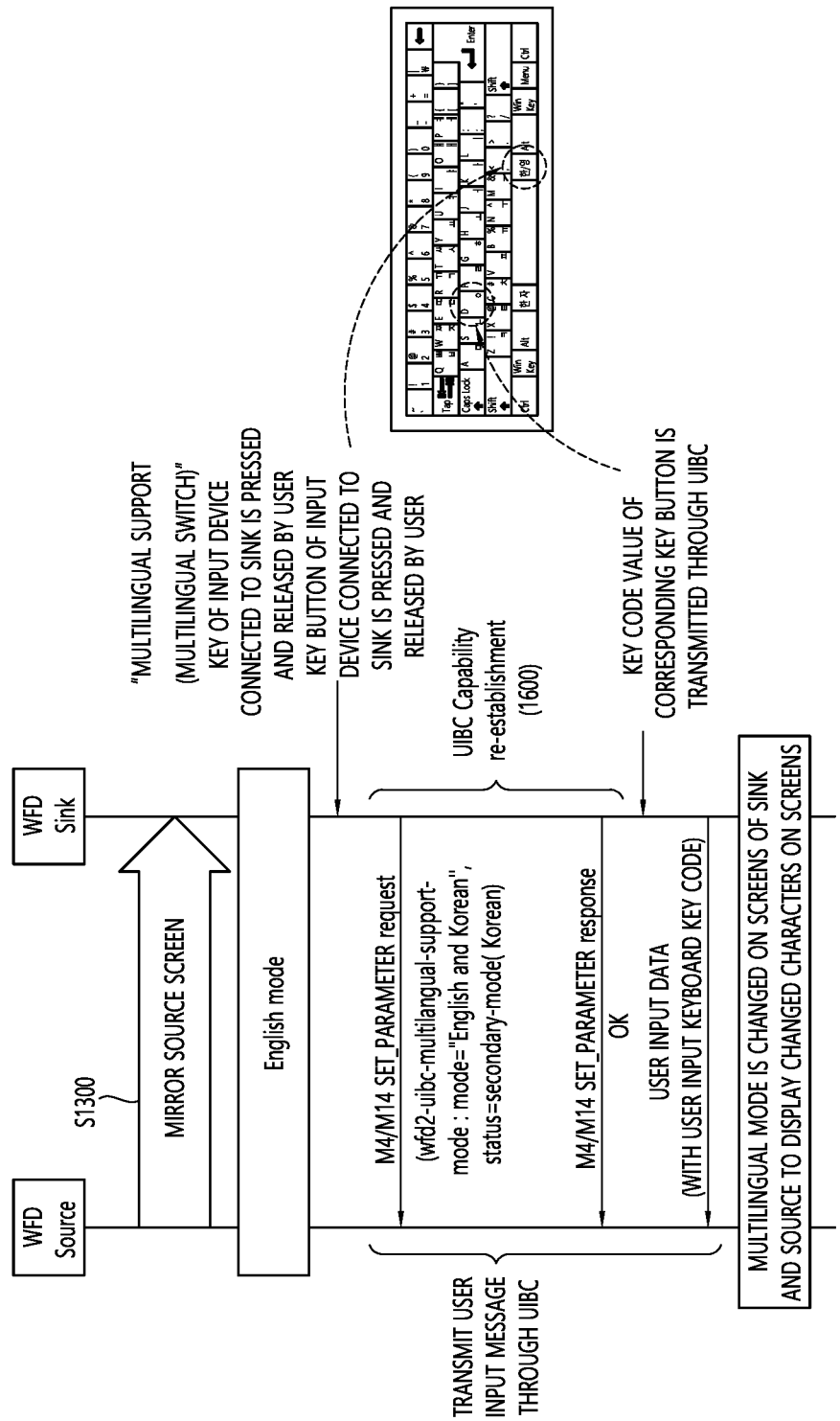
FIG. 16 is a flowchart illustrating a multi-lingual mode switching method based on a modified wfd-uibc-capability parameter according to an embodiment of the present invention.

FIG. 16 is a flowchart illustrating a multilingual mode switching method based on a modified wfd-uibc-capability parameter according to an embodiment of the present invention.

In FIG. 16, a UIBC capability re-establishment procedure is disclosed.

Referring to FIG. 16, the screen of the WFD source may be mirrored to the screen of the WFD sink. It is assumed that the current status indicates English which is the primary mode.

When the character switch button (or multilingual support button) is pressed by the user, a UIBC capability re-establishment procedure 1600 may be performed based on the RTSP M4 request message/RTSP M14 request message by the WFD sink.

The RTSP M4 request/RTSP M14 request message may include the modified wfd-uibc-capability parameter and the modified wfd-uibc-capability parameter may include parameter information on a multilingual mode switching capability for re-establishing the UIBC capability. Specifically, the mode parameter included in the modified wfd-uibc-capability parameter of each of the RTSP M4 request message/ RTSP M14 request message may indicate the switch between English and Korean and the status may indicate Korean which is the secondary mode.

The WFD source may transmit the RTSP M4/M14 response message to the WFD sink.

When the user presses the keyboard connected to the WFD sink, the key code of Korean corresponding to the keyboard may be transmitted to the WFD source through the UIBC.

After changing to Korean mode, Korean may be output on the screens of the WFD sink and the WFD source.

According to another embodiment of the present invention, the wfd2-uibc-multilingual-support parameter as a new parameter is defined and the RSTP message including the wfd2-uibc-multilingual-support parameter may be transmitted to the WFD source whenever the character switch button for multilingual support is pressed by the user.

TABLE 16 wfd2-uibc-multilingual-support = "wfd2-uibc-multilingual-support:" SP multilingual-info CRLF
multilingual-info = multilingual-mode SP primary-mode SP secondary-mode SP status
multilingual-mode = 32*32HEXDIG; see table 2. table 2 indicates one or more multilingual-support-mode for mode switch at a Keyboard
primary-mode = 4*4HEXDIG; indicates value of primary mode of multilingual keyboard
secondary-mode = 4*4HEXDIG; indicates secondary mode (e.g., Korean) secondary mode is activated when the user push the "Multilingual Support" button on the user's Keyboard in primary mode
status = 4*4HEXDIG; indicates value of the current multilingual mode (Primary mode or Secondary mode). Status is toggled between primary mode and secondary mode whenever the user push the "Multilingual Support" button on the Keyboard.

Wfd2-uibc-multilingual-support is newly defined as shown in Table 16 and the wfd2-uibc-multilanguage-support is included in the RTSP M3 request/M3 response message to perform the UIBC capability negotiation.

The wfd2-uibc-multilanguage-support parameter may include the parameter regarding multilingual-info, multilingual-mode, the primary mode, the secondary mode, and the status.

The multilingual information may indicate whether to support the multilingual mode, the primary mode, and the secondary mode.

The multilingual mode may include information on a supportable mode as disclosed in Table 14 above.

The RTSP M4 request message/RTSP M14 request message may include the same information as the parameters regarding the primary mode, the secondary mode, and the status, respectively.

Figure 17:
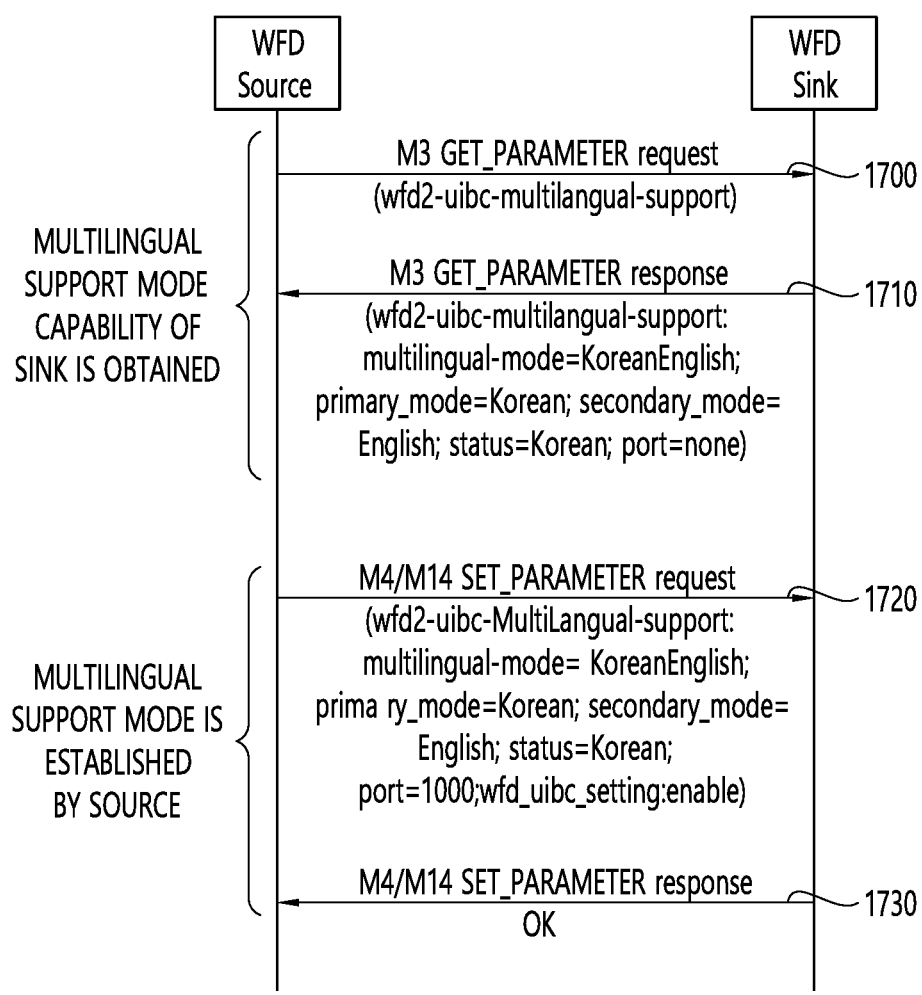
FIG. 17 is a flowchart illustrating a multi-lingual mode switching method based on a wfd-uibc-multi-lingual-support parameter according to an embodiment of the present invention.

FIG. 17 is a flowchart illustrating a multilingual mode switching method based on a wfd-uibc-multilingual-support parameter according to an embodiment of the present invention.

Referring to FIG. 17, the UIBC capability negotiation procedure may be performed between the WFD source and the WFD sink based on the modified wfd-uibc-multilingual-support parameter transmitted via the RTSP M3 request message/RTSP M3 response message.

For example, the WFD source may request information on the UIBC capability of the WFD sink based on the RTSP M3 request message. The mode parameter included in the modified wfd-uibc-multilingual-support parameter of each of the RTSP M3 request message/RTSP M3 response message may indicate the switch between English and Korean, the secondary mode may indicate English, and the status may indicate Korean.

Thereafter, the multilingual support mode establishment procedure (or UIBC capability establishment procedure) may be performed based on the RTSP M4 request message/ RTSP M14 request message transmitted by the WFD source.

The mode parameter may include the wfd-uibc-multilingual-support parameter. The wfd-uibc-multilingual-support parameter included in the RTSP M4 request message/RTSP M14 request message may indicate the switch between English and Korean, the primary mode may indicate Korean, the secondary mode may indicate English, and the status may indicate Korean.

The WFD sink may receive the RTSP M4/M14 response message in response to the RTSP M4/M14 request message.

Figure 18:
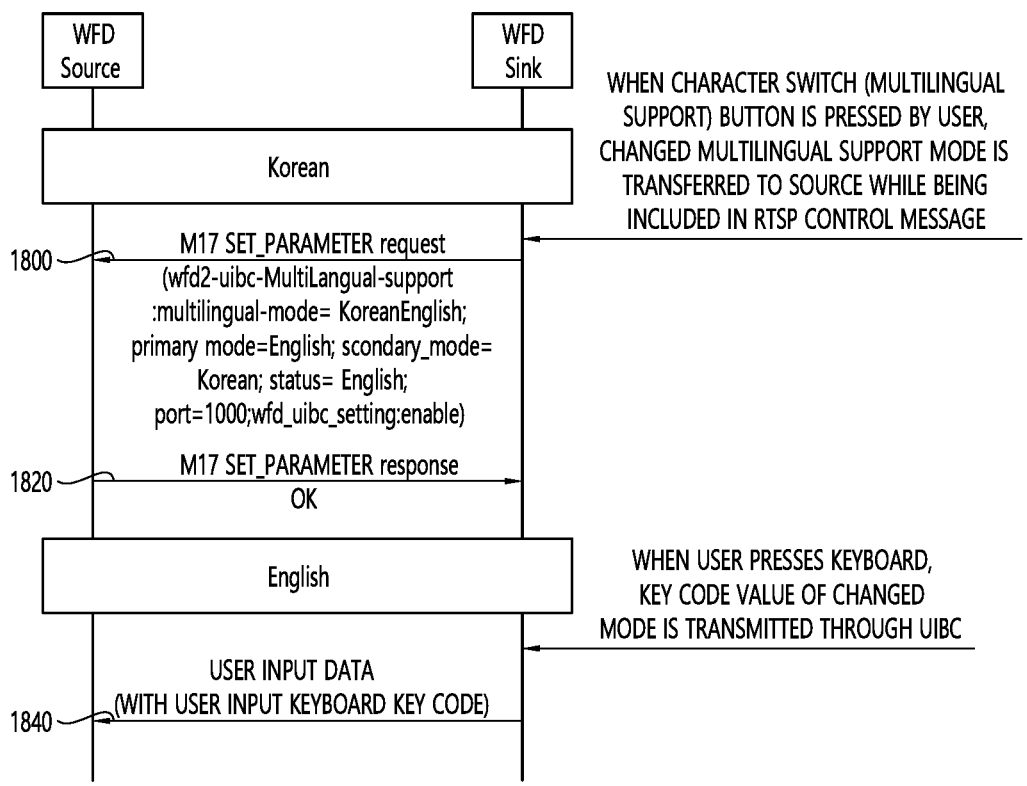
FIG. 18 is a flowchart illustrating a multi-lingual mode switching method based on a wfd-uibc-multi-lingual-support parameter according to an embodiment of the present invention.

FIG. 18 is a flowchart illustrating a multilingual mode switching method based on a wfd-uibc-multilingual-support parameter according to an embodiment of the present invention.

In FIG. 18, when the character switch button (or multilingual support button) is pressed by the user, the operation is started.

Referring to FIG. 18, the user may press the character switch button (or multilingual support button) and when the character switch button (or multilingual support button) is pressed, an RTSP M17 request message may be transmitted.

The WFD sink may transmit the RTSP M17 request message to the WFD source.

The RTSP M17 request message may indicate the switch between English and Korean, the primary mode may indicate Korean, the secondary mode may indicate English, and the status may indicate English. That is, when the character switch button is pressed, the status may be switched from Korean to English.

The WFD source may transmit an RTSP M17 response message to the WFD sink in response to the RTSP M17 request message.

Thereafter, the WFD source and the WFD sink may operate in the English mode.

When the user presses the key of the user input device connected to the WFD sink, a key code value corresponding to an English key may be transmitted to the WFD source via the UIBC.

Figure 19:
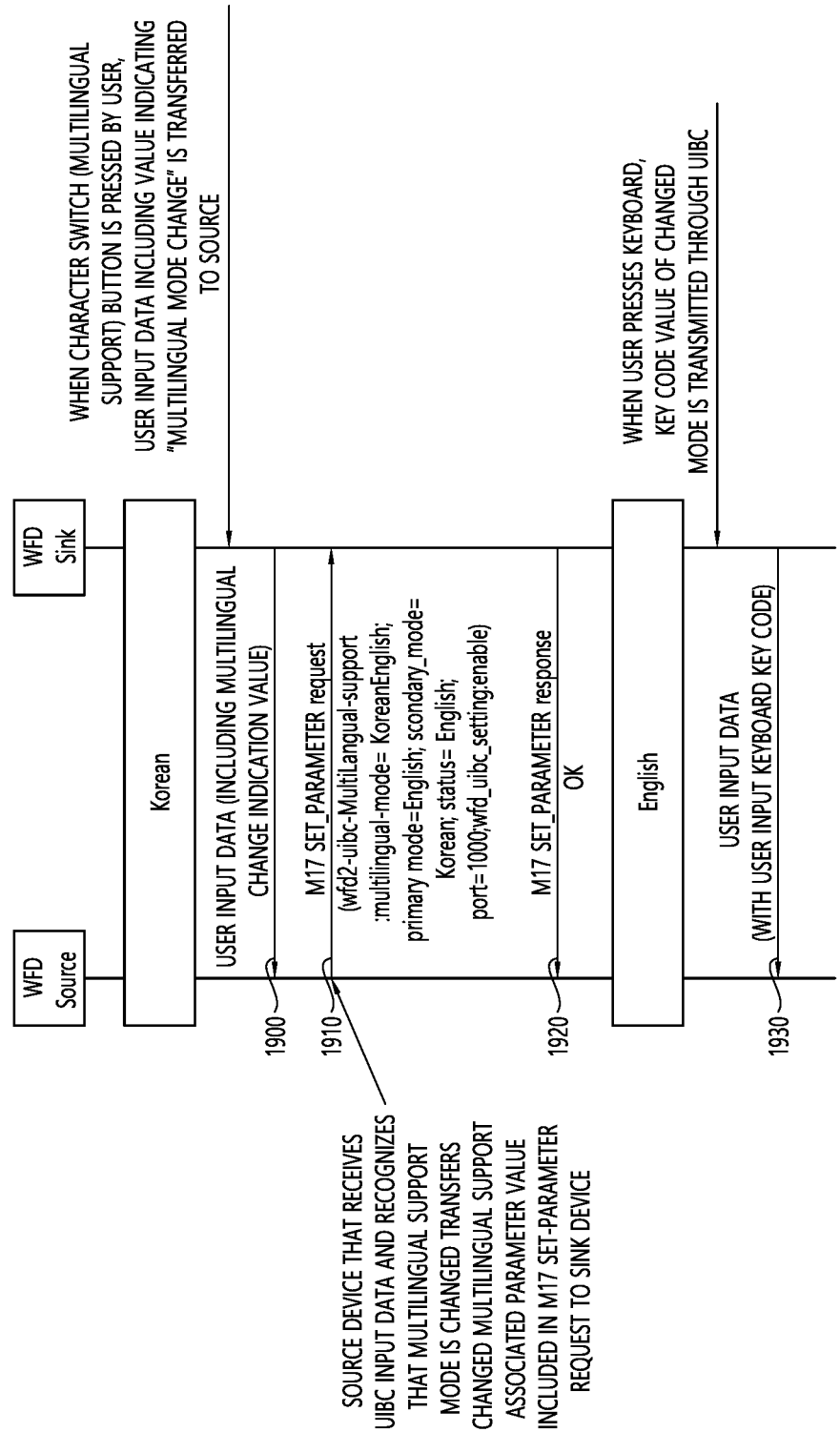
FIG. 19 is a flowchart illustrating a multi-lingual mode switching method based on a wfd-uibc-multi-lingual-support parameter according to an embodiment of the present invention.

FIG. 19 is a flowchart illustrating a multilingual mode switching method based on a wfd-uibc-multilingual-support parameter according to an embodiment of the present invention.

In FIG. 19, when the character switch button (or multilingual support button) is pressed by the user, the operation is started.

Referring to FIG. 19, when the character switch button (or multilingual support button) is pressed by the user, UIBC input data 1900 including a value indicating multilingual mode change may be transmitted from the WFD sink to the WFD source.

The WFD source may transmit an RTSP M17 request message 1910 to the WFD sink after receiving the UIBC input data 1900 containing the value indicating the multilingual mode change.

The RTSP M17 request message 1910 may indicate the switch between English and Korean, the primary mode may indicate Korean, the secondary mode may indicate English, and the status may indicate English.

The WFD sink may transmit an RTSP M17 response message 1920 to the WFD source in response to the RTSP M17 request message 1910.

Thereafter, the WFD source and the WFD sink may operate in the English mode.

When the user presses the key of the user input device connected to the WFD sink, the key code value corresponding to the English key may be transmitted to the WFD source via the UIBC as the user input data 1930.

As described above, the UIBC may support only the ASCII code. When the user presses a key that is not defined by the ASCII code of the keyboard, a character corresponding to the key desired by the user may not be output to the WFD sink and the WFD source.

When the user presses the non-ASCII code, the character corresponding to the key desired by the user may not be output to the WFD sink and the WFD source. For example, the non-ASCII code may be a multi-language (Unicode, so-called international organization for standardization/International electronic commission (ISO/IEC) 10646) and a control key (e.g., Enter, Ctrl, shift, alt, space, etc., so-called ISO/IEC 9995).

Hereinafter, in the embodiment of the present invention, disclosed is a method for transferring the value corresponding to non-ASCII code from the WFD sink to the WFD source when the user presses the key corresponding to the non-ASCII code through the user input device (e.g., the keyboard).

According to the embodiment of the present invention, when the user inputs a key corresponding to the non-ASCII code through the user input device (e.g., the keyboard), the WFD sink may transmit a UIBC input message (or UIBC input body) including the Unicode (ISO/IEC 10646) corresponding to the character input by the user.

As another embodiment, when the user inputs multi-languages (e.g., Chinese character, Japanese character, Korean character, etc.), an ISO/IEC 2022 value may be transmitted while being included in the UIBC input message (or UIBC input body).

The UIBC input body (or UIBC input message) may be generated as a generic input body (or generic input message) or a HIDC input body (or HIDC message) depending on whether user input category is generic category or human interface device class (HIDC) category. The generic input body may include at least one generic input message and the HIDC input body may include at least one HIDC input message.

Table 17 below discloses a format of the UIBC input message (or generic input message) including the Unicode key value (ISO/IEC 10646 or ISO/IEC 2022).

TABLE 17

| Field | Size | Notes |
| --- | --- | --- |
| Generic Input Type ID | | Keyboard |
| Length | | Length of the following fields in octets. |
| Describe | | "Unicode" key value (ISO/IEC 10646 or ISO/IEC 2022) input by the user |

As yet another example, when the user inputs the control key not supported by the ASCII code through the keyboard, a key value (ISO/IEC 9995) corresponding to the control key input by the user may be transmitted to the WFD sink through the UIBC input message (UIBC input body).

Table 18 below discloses the format of the UIBC input message (or generic input message) including the control key value (ISO/IEC 9995).

TABLE 18

| Field | Size | Notes |
| --- | --- | --- |
| Generic Input Type ID | | Keyboard |
| Length | | Length of the following fields in octets. |
| Describe | | "Control Key" value (ISO/IEC 9995) input by the user |

The WFD sink/WFD source receiving the UIBC input message through the format of the UIBC input message as described above may interpret the received character and output the received character on the screen.

According to the embodiment of the present invention, the character (ISO/IEC 10646, Unicode) value is displayed on the screen of each WFD source/WFD sink, while the control key (ISO/IEC 9995) may perform a control function without outputting the character on a device screen. Accordingly, the character and the control key are distinguished and thus, "ISO/IEC 10646, Unicode" and "ISO/IEC 9995" values may be included in the UIBC input message (or user input message).

To this end, in the embodiment of the present invention, a delimiter (or field) called a character/control identifier is defined to distinguish whether the key input through the user input device is the character or the control key.

Table 19 shows the UIBC input message (or generic input message) including the character/control identifier field.

TABLE 19

| Field | Size | Notes |
| --- | --- | --- |
| Generic Input Type ID | | Keyboard |
| Length | | Length of the following fields in octets. |
| Character/Control Identifier | | 0: Character type (ISO/IEC 10646, Unicode) 1: Control key type (ISO/IEC 9995) 0: Character type (ISO/IEC 10646, Unicode) 1: Control Key type (ISO/IEC 9995) |
| Describe | | "Unicode" key value (ISO/IEC 10646 or ISO/IEC 2022) input by the user "Control Key" value (ISO/IEC 9995) input by the user |

For example, when the user inputs the control key via the keyboard, not only the key value defined in ISO/IEC 9995 but also the character control identifier may be together transmitted while being included in the UIBC input message.

Further, according to the embodiment of the present invention, the wfd2-multilingual-capability parameter may be defined for multilingual support through the UIBC.

TABLE 20 wfd2-multilingual-capability = "wfd2_multilingual_capability:" SP
("none"/(supportedKey) CRLF; "none" if not supported
supportedkey = "ASCII"/"ISOIEC10646"/"ISOIEC2022"/
"ISOIEC9995"

Referring to Table 20, information on the ASCII code and the non-ASCII code ("ISOIEC10646"/"ISOIEC2022"/ "ISOIEC9995") supported through the UIBC input message based on the wfd2-multilingual-capability parameter may be transferred.

Figure 20:
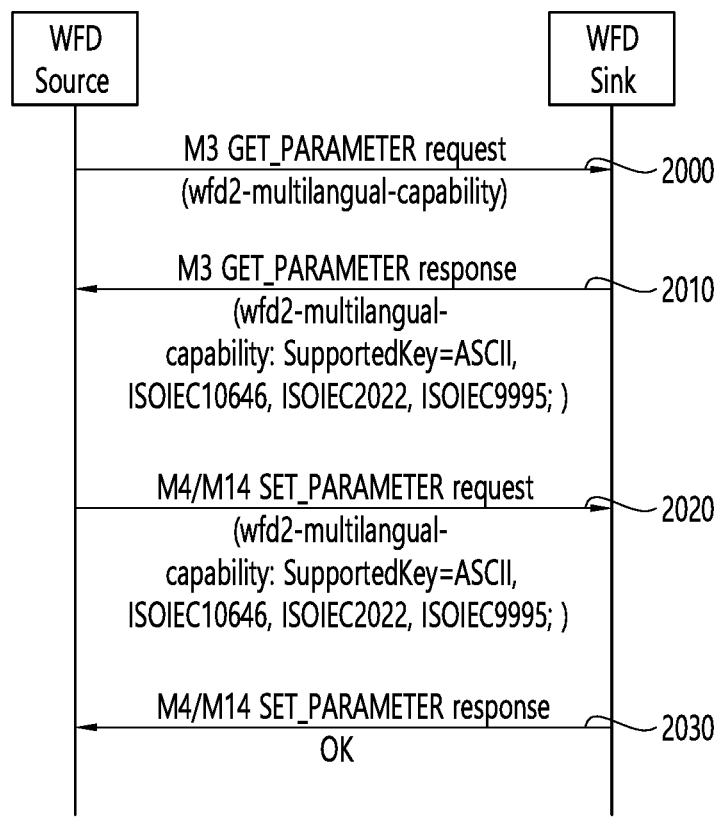
FIG. 20 is a flowchart illustrating a capability negotiation procedure for supporting multi-languages according to an embodiment of the present invention.

FIG. 20 is a flowchart illustrating a capability negotiation procedure for supporting multi-languages according to an embodiment of the present invention.

Referring to FIG. 20, the WFD source may transmit an RTSP M3 request message 2000 to the WFD sink. The RTSP M3 request message 2000 may include the wfd2-multilingual-capability parameter.

The RTSP M3 request message 2000 transmitted by the WFD source may transmit the information on the ASCII code and the non-ASCII code ("ISOIEC10646"/ "ISOIEC2022"/"ISOIEC9995") supported through the UIBC input message by the WFD source based on the wfd2-multilingual-capability parameter. In addition, the RTSP M3 request message 2000 transmitted by the WFD source may request the information on the ASCII codes and the non-ASCII code supported through the UIBC input message supported by the WFD sink.

The WFD sink may transmit an RTSP M3 response message 2010 in response to the RTSP M3 request message 2000 transmitted by the WFD source.

The RTSP M3 response message 2010 may include the wfd2-multilingual-capability parameter and the wfd2-multilingual-capability parameter may include the information on the ASCII code and non-ASCII code supported through the UIBC input message.

Further, an RTSP M4/M14 request message 2020 transmitted by the WFD source may establish the information on the ASCII code and the non-ASCII code supported through the UIBC input message by the WFD source based on the wfd2-multilingual-capability parameter.

The WFD sink may transmit an RTSP M4/M14 response message 2030 in response to the RTSP M4/M14 request message 2020.

Figure 21:
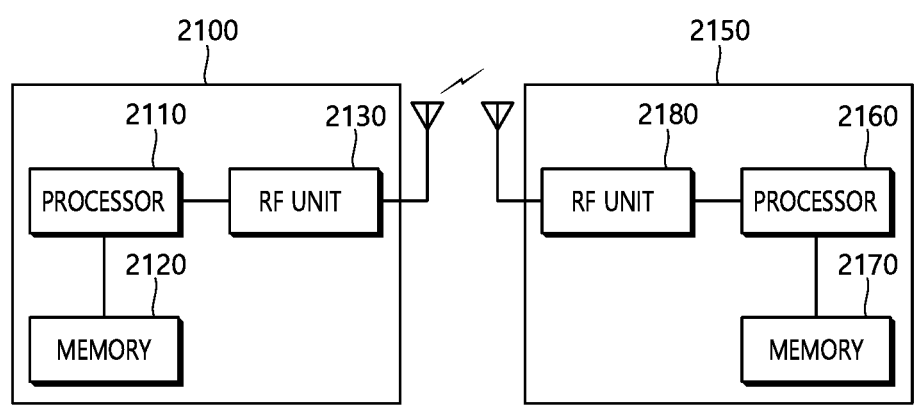
FIG. 21 is a block diagram illustrating a wireless apparatus to which an embodiment of the present invention can be applied.

FIG. 21 is a block diagram illustrating a wireless apparatus to which an embodiment of the present invention can be applied.

Referring to FIG. 21, the wireless apparatus may be a WFD source 2100 (or a first WFD device) and a WFD sink 2150 (or a second WFD device) capable of implementing the embodiments described above.

The WFD source 2100 includes a processor 2110, a memory 2120, and an RF unit 2130.

The RF unit 2130 is connected with the processor 2110 to transmit/receive the radio signal.

The processor 2110 may implement a function, a process, and/or a method proposed in the present invention. For example, the processor 2110 may implemented to perform the operation of the WFD source according to the embodiment of the present invention. The processor may perform the operations of the WFD source 2100 disclosed in the embodiments of FIGS. 1 to 20.

For example, the processor 2110 may be implemented to transmit a character switching capability parameter to the second WFD device through a user input back channel (UIBC) capability negotiation procedure with the second WFD device (or WFD sink) and transmit a first character switch establishment parameter to the second WFD device through a UIBC establishment procedure in order to establish a first character (e.g., English) output on a screen of each of the first and second WFD devices.

Further, the processor 2110 may be implemented to transmit a key code for a character switch button to the second WFD device through the UIBC by means of a user input device of the first WFD device and transmit a second character switch establishment parameter to the second WFD device through a UIBC re-establishment procedure in order to switch a first character output on each of the first and second WFD devices to a second character (e.g., Korean).

The first WFD device may be a device for supporting streaming of multimedia contents and the second WFD device may be a device for receiving and rendering the multimedia contents from the first WFD device through a peer-to-peer (P2P) link with the first WFD device.

In this case, a character switch capability parameter may include a mode parameter, a primary character parameter, a secondary character parameter, and a status parameter.

The mode parameter may include information on at least one character switch type supported by the first WFD device, the primary character parameter may include information on a primary character preferentially established by the UIBC by the first WFD device, and the secondary character parameter may include information on a secondary character switched and established from the primary character on the UIBC by the first WFD device when a key code corresponding to the character switch button is input.

The status parameter may include information indicating whether the character currently established by the first WFD device is the primary character or the secondary character according to the input of the key code and the status parameter may be toggled to the primary character or the secondary character according to the input of the key code.

A first character switch establishment parameter may include a first status parameter, the second character switch establishment parameter may include a second status parameter, the first status parameter may indicate the primary character, and the second status parameter may indicate the secondary character.

In addition, THE processor 2110 may be implemented to TRANSMIT a generic input message including a Unicode key value corresponding to the second character to the second WFD device via the user input device and the generic input message may include a generic input type identifier field, a length field, and a description field.

The generic input type identifier field may include information on the user input device that inputs the second character, the length field may includes information on the length of the description field, and the description field may include information on the Unicode key value.

The generic input message may further include a character/control identifier and the character/control identifier may indicate whether the value included in the description field is the Unicode key value for the character key or the control key value for a function key.

The WFD sink 2150 includes a processor 2160, a memory 2170, and an RF unit 2180.

The RF unit 2180 is connected with the processor 2160 to transmit/receive the radio signal.

The processor 2160 may implement a function, a process, and/or a method proposed in the present invention. For example, the processor 2160 may implemented to perform the operation of the WFD sink 2150 according to the embodiment of the present invention. The processor may perform the operations of the WFD sink 2150 (or second WFD device) disclosed in the embodiments of FIGS. 1 to 20.

For example, the processor 2160 may be implemented to transmit the character switching capability parameter to the first WFD device through the user input back channel (UIBC) capability negotiation procedure with the first WFD device (or WFD source) and transmit the first character switch establishment parameter to the first WFD device through the UIBC establishment procedure in order to establish the first character (e.g., English) output on the screen of each of the first and second WFD devices.

Further, the processor 2160 may be implemented to transmit the key code for the character switch button to the first WFD device through the UIBC by means of the user input device of the second WFD device and transmit the second character switch establishment parameter to the first WFD device through the UIBC re-establishment procedure in order to switch the first character output on each of the first and second WFD devices to the second character (e.g., Korean).

The processors 2110 and 2160 may include an application-specific integrated circuit (ASIC), another chipset, a logic circuit, a data processing device and/or a converter converting a baseband signal and the radio signal into each other. The memories 2120 and 2170 may include a read-only memory (ROM), a random access memory (RAM), a flash memory, a memory card, a storage medium, and/or other storage devices. The RF units 2130 and 2180 may include one or more antennas that transmit and/or receive the radio signal.

When the embodiment is implemented by software, the aforementioned technique may be implemented by a module (a process, a function, and the like) that performs the aforementioned function. The software code may be stored in the memories 2120 and 2170 and executed by the processors 2110 and 2160. The memories 2120 and 2170 may be positioned inside or outside the processors 2110 and 2160 and connected with the processors 2110 and 2160 by various well-known means.

What is claimed is:

1. A method for switching an input character in a wireless communication system, comprising:
    transmitting, by a first wireless device, a character switch capability parameter to a second wireless device through a UIBC capability negotiation process with the second wireless device;
    transmitting, by the first wireless device, a first character switch establishment parameter to the second wireless device through a User Input Back Channel (UIBC) establishment process so as to establish the first character outputted onto each screen of the first wireless device and the second wireless device;
    transmitting, by the first wireless device, a key code for a character switch button through a UIBC to the second wireless device through a user input device of the first wireless device; and
    transmitting, by the first wireless device, a second character switch establishment parameter to the second wireless device through a UIBC re-establishment process so as to switch, to the second character, the first character outputted onto each screen of the first wireless device and the second wireless device,
    wherein the first wireless device is a device for supporting streaming of multimedia contents, and
    wherein the second wireless device is a device for receiving and rendering the multimedia contents from the first wireless device through a peer-to-peer (P2P) link with the first wireless device.

2. The method of claim 1, wherein the character switch capability parameter includes a mode parameter, a primary character parameter, a secondary character parameter, and a status parameter,
    the mode parameter includes information on at least one character switch type supported by the first wireless device,
    the primary character parameter includes information on a primary character preferentially established on the UIBC by the first wireless device,
    the secondary character parameter includes information on a secondary character switched and established from the primary character on the UIBC by the first wireless device when the key code corresponding to the character switch button is input,
    the status parameter includes information indicating whether the character currently established by the first wireless device is the primary character or the secondary character according to the input of the key code, and
    the status parameter is toggled to the primary character or the secondary character according to the input of the key code.

3. The method of claim 2, wherein the first character switch establishment parameter includes a first status parameter,
    the second character switch establishment parameter includes a second status parameter,
    the first status parameter indicates the primary character, and
    the second status parameter indicates the secondary character.

4. The method of claim 3, further comprising:
    transmitting, by the first wireless device, a generic input message including a Unicode key value corresponding to the secondary character to the second wireless device through the user input device,
    wherein the generic input message includes a generic input type identifier field, a length field, and a description field,
    the generic input type identifier field includes information on the user input device through which the secondary character is input,
    the length field includes information on the length of the description field, and
    the description field includes information on the Unicode key value.

5. The method of claim 4, wherein the generic input message further includes a character/control identifier, and
    the character/control identifier indicates indicate whether the value included in the description field is the Unicode key value for the character key or the control key value for a function key.

6. A first wireless device for switching an input character, comprising:
    a communication unit for communication with a second wireless device; and
    a processor connected with the communication unit to be operable, wherein the processor is implemented to
    transmit a character switch capability parameter to a second wireless device through a User Input Back Channel (UIBC) capability negotiation process with the second wireless device, transmit a first character switch establishment parameter to the second wireless device through a UIBC establishment process so as to establish the first character outputted onto each screen of the first wireless device and the second wireless device, transmit a key code for a character switch button through a UIBC to the second wireless device through a user input device of the first wireless device, and transmit a second character switch establishment parameter to the second wireless device through a UIBC re-establishment process so as to switch, to the second character, the first character outputted onto each screen of the first wireless device and the second wireless device, wherein the first wireless device is a device for supporting streaming of multimedia contents, and wherein the second wireless device is a device for receiving and rendering the multimedia contents from the first wireless device through a peer-to-peer (P2P) link with the first wireless device.

7. The first wireless device of claim 6, wherein the character switch capability parameter includes a mode parameter, a primary character parameter, a secondary character parameter, and a status parameter, the mode parameter includes information on at least one character switch type supported by the first wireless device, the primary character parameter includes information on a primary character preferentially established on the UIBC by the first wireless device, the secondary character parameter includes information on a secondary character switched and established from the primary character on the UIBC by the first wireless device when the key code corresponding to the character switch button is input, the status parameter includes information indicating whether the character currently established by the first wireless device is the primary character or the secondary character according to the input of the key code, and the status parameter is toggled to the primary character or the secondary character according to the input of the key code.

8. The first wireless device of claim 7, wherein a first character switch establishment parameter includes a first status parameter, a second character switch establishment parameter includes a second status parameter, the first status parameter indicates the primary character, and the second status parameter indicates the secondary character.

9. The first wireless device of claim 8, wherein the processor is implemented to transmit a generic input message including a Unicode key value corresponding to the secondary character to the second wireless device through the user input device, and the generic input message includes a generic input type identifier field, a length field, and a description field, the generic input type identifier field includes information on the user input device through which the secondary character is input, the length field includes information on the length of the description field, and the description field includes information on the Unicode key value.

10. The first wireless device of claim 9, wherein the generic input message further includes a character/control identifier, and the character/control identifier indicates indicate whether the value included in the description field is the Unicode key value for the character key or the control key value for a function key.

\* \* \* \* \*